(12) United States Patent
Veldanda et al.

(10) Patent No.: US 11,665,227 B2
(45) Date of Patent: *May 30, 2023

(54) SYSTEM AND METHOD FOR INTELLIGENTLY MANAGING SESSIONS IN A MOBILE NETWORK

(71) Applicant: Microsoft Technology Licensing, LLC, Redmond, WA (US)

(72) Inventors: Narsi Veldanda, Northboro, MA (US); Anupama Raghavan, Acton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/562,693

(22) Filed: Dec. 27, 2021

(65) Prior Publication Data
US 2022/0124146 A1   Apr. 21, 2022

Related U.S. Application Data

(63) Continuation of application No. 16/519,993, filed on Jul. 23, 2019, now Pat. No. 11,212,343.

(60) Provisional application No. 62/702,093, filed on Jul. 23, 2018.

(51) Int. Cl.
| | |
|---|---|
| G06F 15/173 | (2006.01) |
| H04L 67/1008 | (2022.01) |
| H04W 76/12 | (2018.01) |
| H04L 67/1014 | (2022.01) |
| H04W 8/08 | (2009.01) |
| H04L 61/4511 | (2022.01) |

(52) U.S. Cl.
CPC ...... *H04L 67/1008* (2013.01); *H04L 61/4511* (2022.05); *H04L 67/1014* (2013.01); *H04W 8/08* (2013.01); *H04W 76/12* (2018.02)

(58) Field of Classification Search
None
See application file for complete search history.

(56) References Cited

U.S. PATENT DOCUMENTS

2013/0121298 A1*   5/2013   Rune .................. H04L 61/4511
                                                 370/329

OTHER PUBLICATIONS

"Office Action Issued in Indian Patent Application No. 202047054084", dated Sep. 28, 2022, 7 Pages.

* cited by examiner

*Primary Examiner* — Wing F Chan
*Assistant Examiner* — Andrew Woo
(74) *Attorney, Agent, or Firm* — Ray Quinney & Nebeker P.C; James Bullough

(57) ABSTRACT

Systems and methods are described for intelligently managing sessions in a mobile network. A selection engine receives a trigger to select a peer node for a subscriber session. The selection engine chooses a peer selector among one or more available peer selectors in response to the trigger and determines whether the chosen peer selector is associated with a fully qualified domain name (FQDN). In response to determining that the chosen peer selector is associated with the FQDN, the selection engine determines whether a domain name system (DNS) server is configured. In response to determining that the DNS server is configured, the selection engine requests a peer list associated with the FQDN from the DNS server and selects the peer node from the peer list.

20 Claims, 21 Drawing Sheets

| Packet Type 1602 | Network Element Type 1604 | Network Element TEID 1606 | GTP Proxy TEID 1608 | Network Element Restart Counter 1610 | GTP Proxy Restart Counter 1612 |
|---|---|---|---|---|---|
| GTP-U | SGW1 | 500 | 600 | | |
| GTP-C | SGW1 | 502 | 602 | 20 | 30 |
| GTP-U | PGW1 | 504 | 604 | | |
| GTP-C | PGW1 | 506 | 606 | 40 | 50 |

FIG. 16

SYSTEM AND METHOD FOR INTELLIGENTLY MANAGING SESSIONS IN A MOBILE NETWORK

CROSS-REFERENCE TO RELATED APPLICATIONS

This application claims priority to U.S. Provisional Application No. 62/702,093, filed Jul. 23, 2018, titled "System and Method for Intelligently Managing Sessions In A Mobile Network," the contents of which are incorporated herein in their entirety.

TECHNICAL FIELD

Embodiments of the present disclosure relate generally to mobile networks, and in particular, to managing sessions in a mobile network.

BACKGROUND

Wireless operators deploy multiple gateway node (e.g., serving gateway (SGW)/packet data network gateway (PGW)/system architecture evolution gateway (SAEGW)) network elements in order to provide service to millions of subscriber packet data network (PDN)-Sessions and multiple access point names (APNs) in their network (as single node cannot handle that much capacity). Conventionally, to load balance PDN-sessions across these SGW/PGW/SAEGW network-elements, a mobility management engine (MME) uses simple round-robin algorithm. To load balance the PDN-session, the MME queries a domain name service (DNS) network element to return a list of SGW/PGW/SAEGW network elements that it can choose for a given APN and subscriber tracking area, and then round-robins new PDN-Sessions across the given SGW/PGW/SAEGW network element list. This approach is limited because the MME is working off a static list that does not take into consideration changing conditions (e.g., network node capacity, PDN-sessions supported by a network node, network node status).

SUMMARY

Systems and methods are described herein for intelligently managing sessions in a mobile network. In some embodiments, a method includes receiving, by a selection engine, a trigger to select a peer node for a subscriber session; choosing, by the selection engine, a peer selector among one or more available peer selectors in response to the trigger; determining, by the selection engine, whether the chosen peer selector is associated with a fully qualified domain name (FQDN); in response to determining that the chosen peer selector is associated with the FQDN, determining, by the selection engine, whether a domain name system (DNS) server is configured; in response to determining that the DNS server is configured, requesting, by the selection engine, a peer list associated with the FQDN from the DNS server; and selecting, by the selection engine, the peer node from the peer list.

In some embodiments, the trigger includes at least one of an indication of session-related control traffic traversing a node associated with the selection engine or a request to select the peer node.

In some embodiments, choosing the peer selector further includes analyzing subscriber session data to determine one or more parameters of the subscriber session; identifying one or more matching peer selectors among the one or more available peer selectors that have key types that match the one or more parameters; and choosing the peer selector from among the one or more matching peer selectors based on the chosen peer selector having a highest priority among the one or more matching peer selectors.

In some embodiments, the DNS server is configured when at least one of a primary DNS server or a secondary DNS server is provisioned and reachable.

In some embodiments, in response to determining that (a) the chosen peer selector is not associated with the FQDN or (b) the DNS server is not configured, obtaining, by the selection engine, the peer list from the chosen peer selector.

In some embodiments, selecting the peer node from the peer list further includes receiving, by the selection engine, the peer list; eliminating, by the selection engine, one or more unreachable peer nodes from the peer list; eliminating, by the selection engine, one or more peer nodes that are in overload from the peer list; grouping, by the selection engine, one or more remaining peer nodes in the peer list based on a load level associated with each of the one or more remaining peers, yielding a plurality of peer groups that each include one or more peer nodes; and selecting, by the selection engine, the peer node from a least loaded peer group among the plurality of peer groups.

In some embodiments, each of the one or more unreachable peer nodes is at least one of failed, undergoing maintenance, or disconnected from a network.

In some embodiments, each of the one or more peer nodes that are in overload is at least one of at maximum capacity, within a threshold of reaching maximum capacity, or experiencing an issue associated with software corruption.

In some embodiments, the method further includes receiving, by the selection engine, a status message that identifies at least one of the one or more unreachable peer nodes or the one or more peer nodes that are in overload.

In some embodiments, the peer node is selected from the least loaded peer group using at least one of round robin, weighted round robin, or hashing.

In some embodiments, the selection engine is implemented in one of: a mobility management engine for selecting a serving gateway peer node; an evolved packet data gateway for selecting a packet data network gateway peer node; a control plane node for selecting a user plane peer node; or a GPRS Tunneling Protocol Proxy (GTP Proxy) for selecting a gateway peer node.

In some embodiments, a system includes a memory; and one or more processors coupled to the memory, the one or more processors being configured to read instructions from the memory that, during execution, cause the one or more processors to perform operations comprising: receiving a trigger to select a peer node for a subscriber session; choosing a peer selector among one or more available peer selectors in response to the trigger; determining whether the chosen peer selector is associated with a fully qualified domain name (FQDN); in response to determining that the chosen peer selector is associated with the FQDN, determining whether a domain name system (DNS) server is configured; in response to determining that the DNS server is configured, requesting a peer list associated with the FQDN from the DNS server; and selecting, by the selection engine, the peer node from the peer list.

In some embodiments, choosing the peer selector further includes analyzing subscriber session data to determine one or more parameters of the subscriber session; identifying one or more matching peer selectors among the one or more available peer selectors that have key types that match the one or more parameters; and choosing the peer selector from among the one or more matching peer selectors based on the chose peer selector having a highest priority among the one or more matching peer selectors.

In some embodiments, in response to determining that (a) the chosen peer selector is not associated with the FQDN or (b) the DNS server is not configured, obtaining, by the selection engine, the peer list from the chosen peer selector.

In some embodiments, selecting the peer node from the peer list further includes receiving, by the selection engine, the peer list; eliminating one or more unreachable peer nodes from the peer list; eliminating one or more peer nodes that are in overload from the peer list; grouping one or more remaining peer nodes in the peer list based on a load level associated with each of the one or more remaining peers, yielding a plurality of peer groups that each include one or more peer nodes; and selecting the peer node from a least loaded peer group among the plurality of peer groups.

In some embodiments, a non-transitory computer-readable medium storing instructions that, when executed by a selection engine comprising one or more hardware processors, cause the selection engine to perform operations including receiving a trigger to select a peer node for a subscriber session; choosing a peer selector among one or more available peer selectors in response to the trigger; determining whether the chosen peer selector is associated with a fully qualified domain name (FQDN); in response to determining that the chosen peer selector is associated with the FQDN, determining whether a domain name system (DNS) server is configured; in response to determining that the DNS server is configured, requesting a peer list associated with the FQDN from the DNS server; and selecting, by the selection engine, the peer node from the peer list.

In some embodiments, the trigger includes at least one of an indication of session traffic traversing a node associated with the selection engine or a request to select the peer node.

In some embodiments, choosing the peer selector further includes analyzing subscriber session data to determine one or more parameters of the subscriber session; identifying one or more matching peer selectors among the one or more available peer selectors that have key types that match the one or more parameters; and choosing the peer selector from among the one or more matching peer selectors based on the chose peer selector having a highest priority among the one or more matching peer selectors.

In some embodiments, in response to determining that (a) the chosen peer selector is not associated with the FQDN or (b) the DNS server is not configured, obtaining, by the selection engine, the peer list from the chosen peer selector.

In some embodiments, selecting the peer node from the peer list further includes receiving the peer list; eliminating one or more unreachable peer nodes from the peer list; eliminating one or more peer nodes that are in overload from the peer list; grouping one or more remaining peer nodes in the peer list based on a load level associated with each of the one or more remaining peers, yielding a plurality of peer groups that each include one or more peer nodes; and selecting peer node from a least loaded peer group among the plurality of peer groups.

These and other capabilities of the disclosed subject matter will be more fully understood after a review of the following figures, detailed description, and claims. It is to be understood that the phraseology and terminology employed herein are for the purposes of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 16 is a table showing parameters a GTP proxy maintains in order to switch tunnels when processing GTP-U and GTP-C traffic, according to some embodiments of the present disclosure.

DETAILED DESCRIPTION

Figure 1:
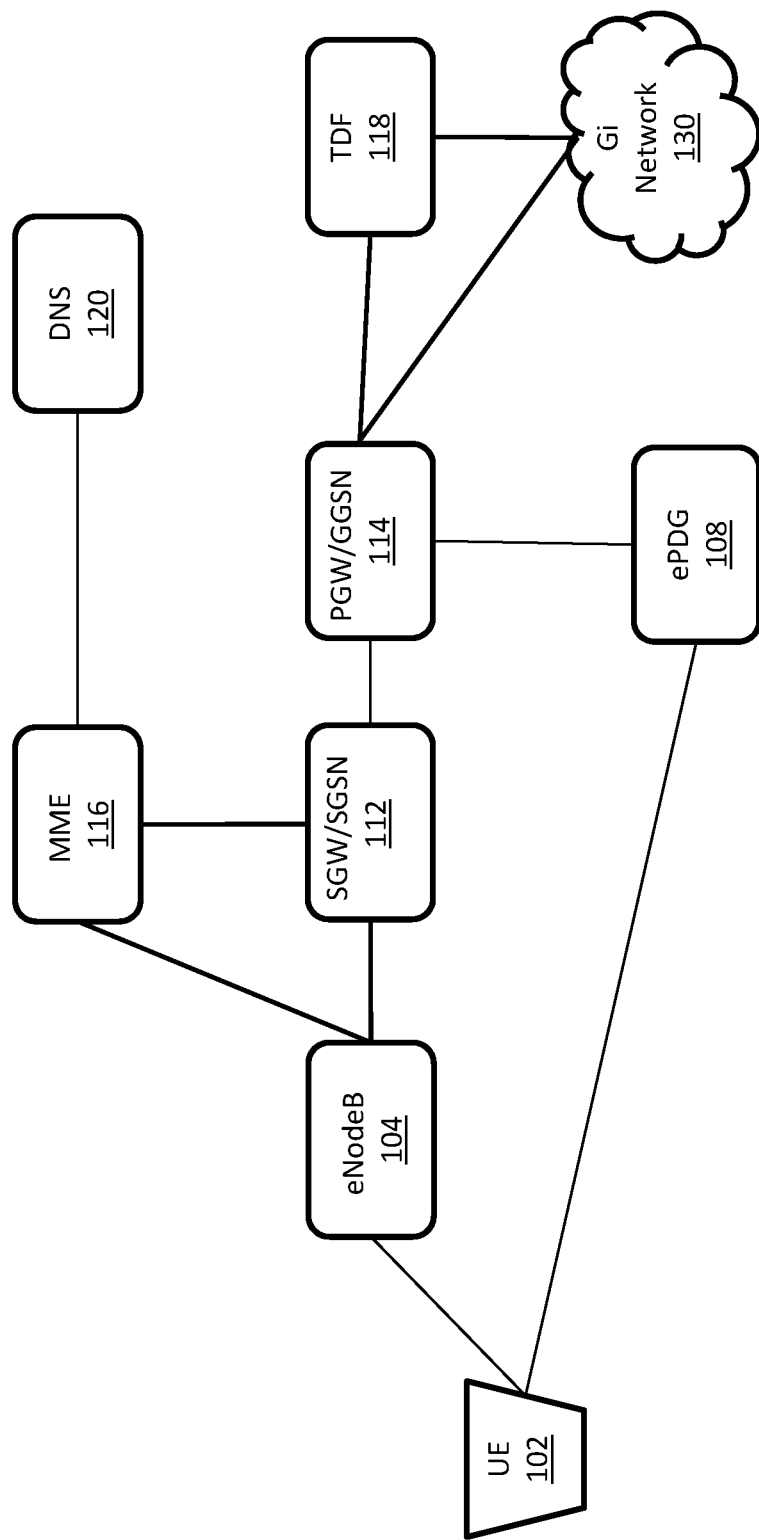
FIG. 1 is a system diagram showing a networked system.

Systems and methods are described herein for introducing an intelligent selection engine within the network to address the problems described above. The intelligent selection engine can be located at multiple points in the network to provide load balancing, path management, tunnel switching, topology hiding, call detail record (CDR) generation, APN name manipulation, Gy interface functionality, and local and geographic redundancy.

Wireless operators typically deploy multiple serving gateway (SGW), packet data network gateway (PGW), and gateway general packet radio service (GPRS) support node (GGSN) network elements in their network to provide service for millions of subscribers for multiple access point names (APN)s (as single node cannot handle that much capacity). When setting up a subscriber's session in the network, mobile management entity (MME)/serving general packet radio service (GPRS) support node (SGSN) uses domain name system (DNS) queries to retrieve lists of SGW/PGW/GGSNs that it can choose from for a given APN. If operators wish to add, remove or move SGW/PGW/GGSNs from their network, corresponding changes are made to the DNS node. Making such changes to the DNS node settings can be a cumbersome process. Operators also have no flexibility in choosing SGW/PGW/GGSN nodes based on certain characteristics of the user equipment (UE) such as location, Mobile Country Code, etc.

For example, MME uses simple round-robin algorithm to load balance PDN-Sessions across these SGW/PGW/SAEGW network-elements. For this MME network element queries DNS network element to return list of SGW/PGW/SAEGW network elements that it can choose for a given APN, subscriber Tracking Area and other parameters and then MME network element then round-robin new PDN-Sessions across the given SGW/PGW/SAEGW network element list. There are few problems with this approach:

1. MME assumes that all SGW/PGW/SAEGW network-elements support same PDN-Session capacity and the PDN-Session signaling rate. But this assumption might not be true when wireless operator picks multiple SGW/PGW/SAEGW network-element vendors and also when operator deploys different capacity and performance SGW/PGW/SAEGW network-element from same vendor. Additionally, in virtualized SGW/PGW/SAEGW environments the capacity of the network-element dynamically changes when VMs or containers in network-element cluster are added or removed. As such, the assumption of static PDN-Session capacity and PDN-Session signaling rate is not valid especially in virtualized EPC.
2. In wireless operator networks, there can be multiple MMEs and each MME independently selects SGW/PGW/SAEGW network-elements for hosting PDN-Sessions on SGW/PGW/SAEGW network-elements and because each MME does not know the exact number of PDN-Sessions associated with each SGW/PGW/SAEGW network-element. As such, MME does not have the accurate current load information on each SGW/PGW/SAEGW network-element to use for load balancing.
3. If SGW/PGW/SAEGW network-element returns "System Busy" for a request, then MME chooses an alternate network-element, which adds latency in session setup.
4. During a planned SGW/PGW/SAEGW down time (e.g., during software upgrade), a network element that is down cannot notify MME not to pick it for new sessions.

Another problem that operators face when they work with multiple vendors to deploy SGW/PGW/GGSNs in their network is subscriber roaming. When subscribers roam out of the operator networks, they use SGWs present in the roamed networks to establish a session towards the PGW located in the operator network. The subscriber's billing information is provided by the roaming partners. Operators do not have the ability to reconcile these billing records in real time with billing records generated by a node in their network to ensure integrity of billing data.

FIG. 1 is a system diagram showing a networked system. FIG. 1 shows user equipment (UE) 102, evolved node B (eNodeB) 104, evolved packet data gateway (ePDG) 108, serving gateway (SGW)/serving GPRS support node (SGSN) 112, packet data network gateway (PGW)/gateway GPRS support node (GGSN) 114, mobility management entity (MME) 116, traffic detection function (TDF) 118, domain name system (DNS) 120, and Gi network 130.

UE 102 connects to the networked system 100 through eNodeB 104. UE 102 includes computing devices configured to connect to a mobile data network (e.g., mobile phones, tablets, laptops). eNodeB 104 is a radio part of a cell site. A single eNodeB 104 may contain several radio transmitters, receivers, control sections and power supplies. eNodeB 104 can be backhauled to MME 116 and SGW/SGSN 112. Backhaul is a process of transferring packets or communication signals over relatively long distances to a separate location for processing. SGW/SGSN 112 routes and forwards user data packets while also acting as the mobility anchor for a user plane during inter-eNodeB handovers. In some network implementations, only one of SGW and SGSN are present in the network. For example, SGSN acts a serving node in a general packet radio service (GPRS) network, and SGW acts as a serving node in an evolved packet core (EPC) network. In some network implementations, both SGSN and SGW are present as separate nodes, for example with SGW acting as a serving node for traffic coming from SGSN. MME 116 is a control node in the networked system 100. MME 116 handles paging and tagging procedures, as well as retransmissions. MME 116 may not be present in a GPRS network as SGSN 112 includes similar functions as the MME 116.

When UE 102 attaches to the network, multiple control messages are exchanged between network elements in order to create a data session (e.g., 3G session, 4G session) and provide data connectivity to the UE 102. As explained above, eNodeB 104 can be backhauled to MME 116 and SGW/SGSN 112. SGW/SGSN 112 routes and forwards user packets to PGW/GGSN 114. In some network implementations, only one of PGW and GGSN are present in the network. For example, GGSN acts a serving node in a general packet radio service (GPRS) network, and PGW acts as a serving node in an evolved packet core (EPC) network. PGW/GGSN 114 routes packets to and from Gi Network 116. Gi Network 116 can include any enterprise or origin servers. Gi Network 116 can connect to the internet or any other third-party server.

ePDG 108 connects a UE 102 from a non-trusted network (e.g., Wi-fi network) to a trusted network. ePDG 108 generally routes data from a non-trusted network to a PGW in an EPC network. ePDG 108 can include processing capability, including deep packet inspection, policy enforcement, and tunnel authentication.

TDF 118 is a traffic management network element introduced with LTE Release 11. TDF 118 analyzes data session traffic and enforces policies set by a provider (also referred to herein as service provider or operator).

DNS 120 translates domain names into IP addresses and can be queried by any of the network nodes described above. DNS 120 can be implemented in servers connected to network nodes over an internal or external network connection. Each of the network nodes described above can be configured to communicate with DNS 120.

Figure 2:
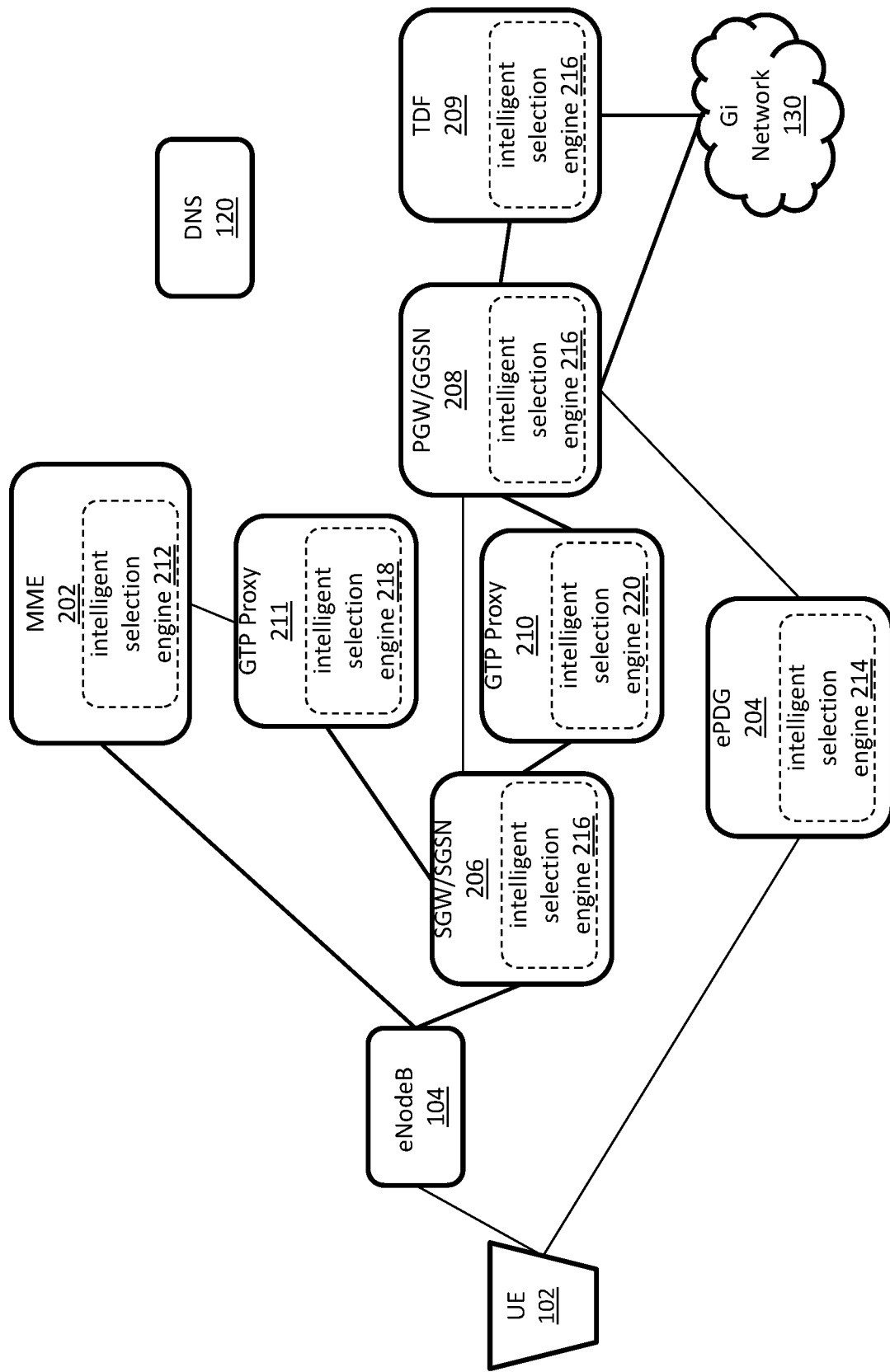
FIG. 2 is a system diagram showing a networked system, according to some embodiments of the present disclosure.

FIG. 2 is a system diagram showing a networked system, according to some embodiments of the present disclosure. FIG. 2 shows user equipment (UE) 102, evolved node B (eNodeB) 104, evolved packet data gateway (ePDG) 204, serving gateway (SGW)/serving GPRS support node (SGSN) 206, packet data network gateway (PGW)/gateway GPRS support node (GGSN) 208, traffic detection function (TDF) 209, mobility management entity (MME) 202, GPRS Tunneling Protocol Proxy (GTP Proxy) 210, domain name system (DNS) 120, and Gi network 130. FIG. 2 also shows intelligent selection engines 212, 214, 216, 220 associated with MME 202, ePDG 204, SGW/SGSN 206 and PGW/GGSN 208, GTP Proxy 210, and GTP Proxy 211, respectively, as well as stand-alone session management engine 218.

Each of intelligent selection engines 212, 214, 216, 218, 220 can be deployed independently or in conjunction with another intelligent selection engine.

MME 202, ePDG 204, SGW/SGSN 206 and PGW/GGSN 208 are similar to MME 116, ePDG 108, SGW/SGSN 112 and PGW/GGSN 114 with the addition of having session management capabilities, which will be described in more detail below. Briefly, intelligent selection engine 212, which is integrated with MME 202, enables MME 202 to select between one of several SGWs based on SGW availability and load; intelligent selection engine 214, which is integrated with ePDG 204, enables ePDG 204 to select between one of several PGWs based on PGW availability and load; intelligent selection engine 216, which is integrated with a control plane for SGW, PGW, or TDF (also referred to as SGW-C, PGW-C, or TDF-C), enables SGW-C, PGW-C or TDF-C to select between one of several user plane SGWs, PGWs, or TDFs (also referred to as SGW-Us, PGW-Us, or TDF-Us), respectively, based on user plane availability and load; intelligent selection engine 218, which is a stand-alone node, can override MME's choice of SGW based on SGW availability and load; and intelligent selection engine 220, which is integrated with GTP Proxy 210, enables GTP Proxy 210 to select between one of several PGWs and/or GGSNs based on PGW/GGSN availability and load.

GTP Proxy 210 translates data routed from SGW/SSGN to PGW/GGSN when there is a mismatch in protocols (e.g., different APNs), for example, when SGW/SSGN and PGW/GGSN are under control of different mobile network operators (MNOs). As described in more detail below, GTP proxy 210, in addition to load balancing, can also be used to hide network topology, translate session information between different LTE release formats, map APNs, and provide enhanced charging capabilities. While GTP-proxy 210 is shown in FIG. 2 to have only intelligent selection engine 220, GTP proxy 210 can also include other modules.

GTP Proxy 211 translates data routed from MME 202 to SGW/SSGN 206. As described in more detail below, GTP proxy 210 211 can be inserted between SGW/SSGN and PGW/GGSN or between MME and SGW to hide network topology, translate session information between different LTE release formats, map APNs, and provide enhanced charging capabilities and load balancing. GTP proxy 210 211 acts as a GTP endpoint between SGWs/SGSNs and PGWs/GGSNs, and between MMEs and SGWs supporting Gn, Gp, S5 and S8 and S11 interfaces. It supports termination and relay of both GTP-C and GTP-U traffic. When inserted between nodes, it hides the network topology by selecting the SGW and PGW nodes to forward the session setup requests to. Similarly, when inserted between an SGW/SGSN and PGW/GGSN, it selects the PGW/GGSN nodes to forward the session setup request too. It should be appreciated that intelligent selection engines can also be implemented in 5G networks or other network architectures, as described in more detail, for example, with reference to FIG. 21.

Figure 3:
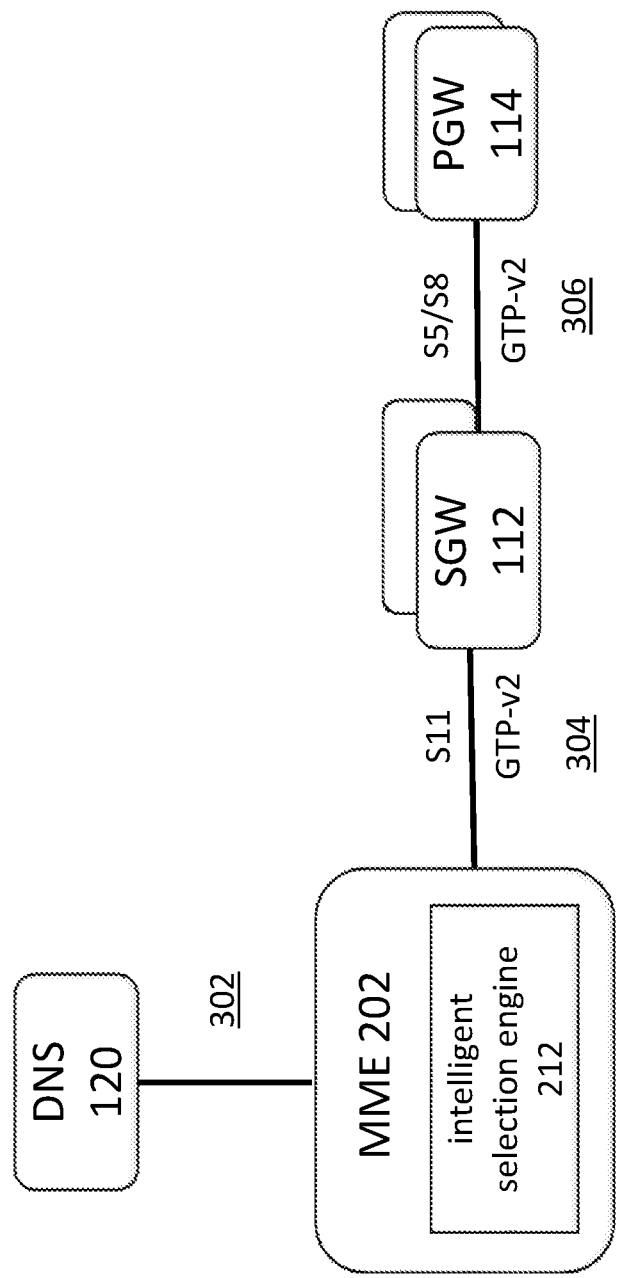
FIG. 3 is a system diagram showing an MME including an intelligent selection engine, according to some embodiments of the present disclosure.

FIG. 3 is a system diagram showing an MME including an intelligent selection engine, according to some embodiments of the present disclosure. FIG. 3 shows MME 202 including intelligent selection engine 212, DNS 120, SGW 112, PGW 114, DNS 120 to MME 202 interface 302, MME 202 to SGW 112 interface 304, and SGW 112 to PGW 114 interface 306.

Intelligent selection engine 212 runs as a micro-service or library in MME 202. The intelligent selection engine 212 can run as a container or virtual machine or on a blade within MME 202. MME 202 interfaces with DNS 120 using DNS queries 302. As described in more detail below, MME 202 queries DNS 120 to select an SGW 112 for a given UE 102 session based on availability and load of the SGWs. MME 202 interfaces with SGW 304 over S11 and GTP-v2, and SGW interfaces with PGW 306 over S5/S8 and GTP-v2. As described in more detail below, intelligent selection engine 212 allows MME 202 to choose an SGW 112 and PGW 114 based on criteria such as priority, load, and peer status.

Figure 4:
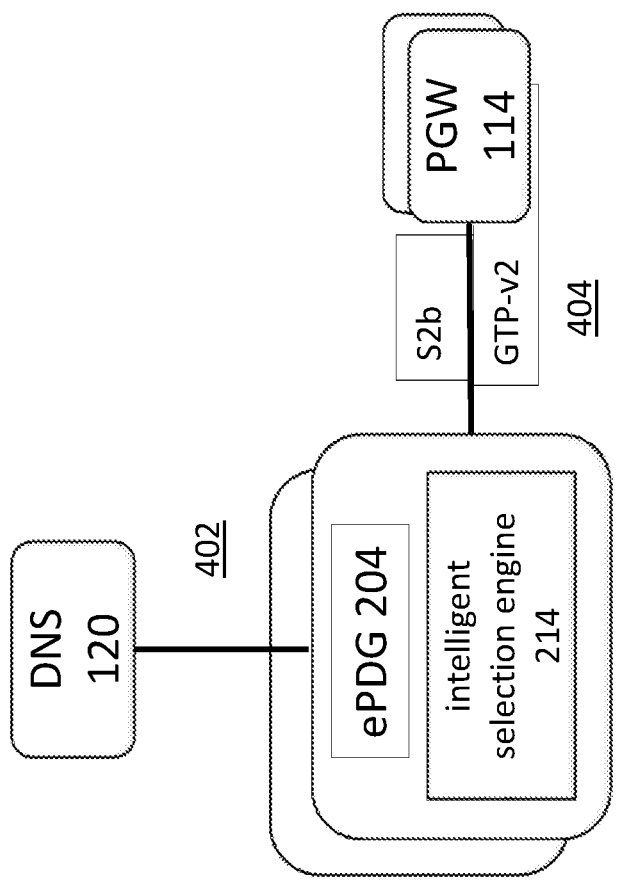
FIG. 4 is a system diagram showing an ePDG including an intelligent selection engine, according to some embodiments of the present disclosure.

FIG. 4 is a system diagram showing an ePDG including an intelligent selection engine, according to some embodiments of the present disclosure. FIG. 4 shows ePDG 204 including intelligent selection engine 212, DNS 120, PGW 114, DNS 120 to ePDG interface 402, and ePDG 204 to PGW 114 interface 404.

Intelligent selection engine 214 runs as a micro-service or library in ePDG 204. The intelligent selection engine 214 can run as a container or virtual machine or on a blade within ePDG 204. ePDG 204 interfaces with DNS 120 using DNS queries 402. As described in more detail below, ePDG 204 queries DNS 120 to select a PGW 114 for a given UE 102 session based on availability and load of the PGWs. ePDG 204 interfaces with PGW 114 over 52b and GTP-v2.

Figure 5:
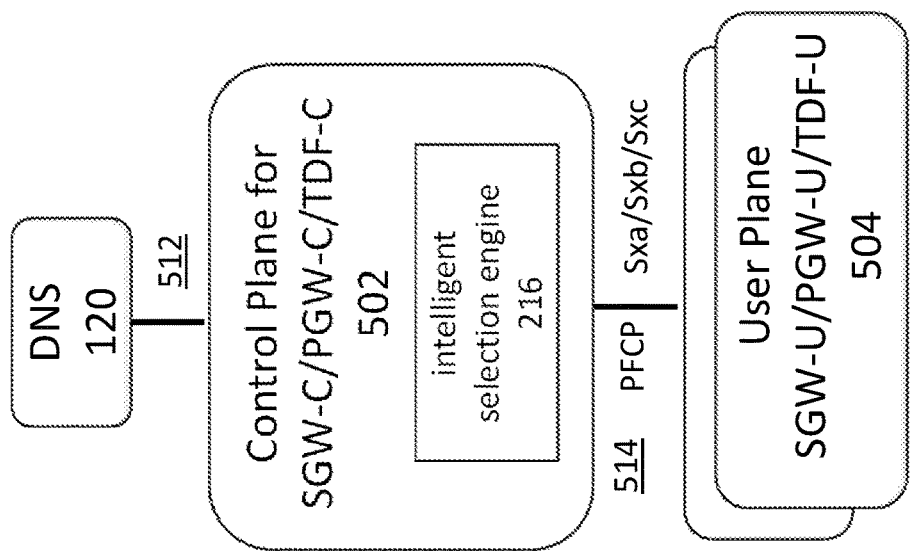
FIG. 5 is a system diagram showing a control plane for SGW, PGW, or TDF including an intelligent selection engine, according to some embodiments of the present disclosure.

FIG. 5 is a system diagram showing a control plane for SGW, PGW, or TDF including an intelligent selection engine, according to some embodiments of the present disclosure. FIG. 5 shows control plane for SGW-C/PGW-C/TDF-C 502 including intelligent selection engine 216, DNS 120, user plane for SGW-U/PGW-U/TDF-U 504, DNS 120 to control plane SGW-C/PGW-C/TDF-C interface 512, and control plane SGW-C/PGW-C/TDF-C to user plane SGW-U/PGW-U/TDF-U interface 514.

Intelligent selection engine 216 runs as a micro-service or library in one of SGW-C, PGW-C, or TDF-C 502. The intelligent selection engine 216 can run as a container or virtual machine or on a blade within the control plane of SGW-C, PGW-C, or TDF-C 502. The control plane of SGW-C, PGW-C, or TDF-C 502 interfaces with DNS 120 using DNS queries 512. As described in more detail below, control plane of SGW-C, PGW-C, or TDF-C 502 queries DNS 120 to select a user plane for SGW-U, PGW-U, or TDF-U 504 for a given UE 102 session based on availability and load of the user planes for SGW-U, PGW-U, or TDF-U.

Control plane of SGW-C, PGW-C, or TDF-C 502 interfaces with user plane for SGW-U, PGW-U, or TDF-U 504 over Packet Forwarding Control Plane Protocol (PFCP) and Sxa, Sxb, or Sxc.

Figure 6:
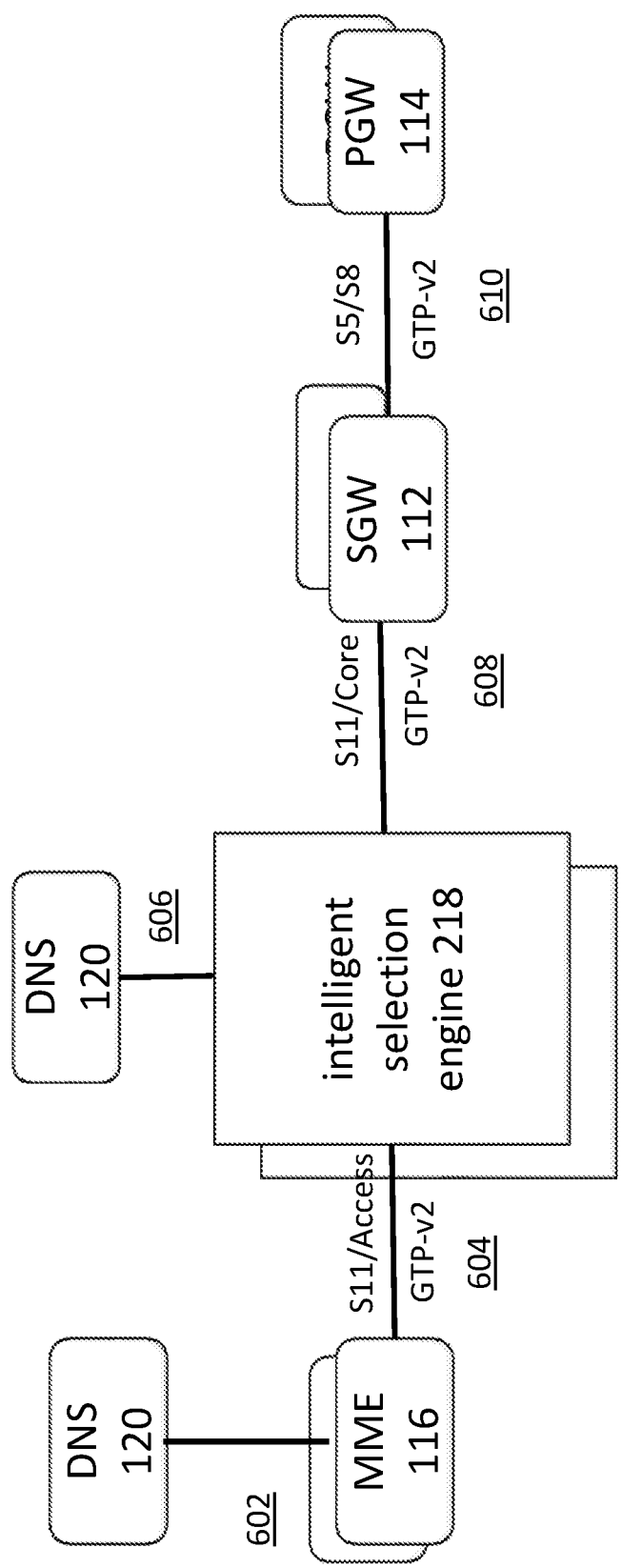
FIG. 6 is a system diagram showing a standalone intelligent selection engine, according to some embodiments of the present disclosure.

FIG. 6 is a system diagram showing a standalone intelligent selection engine, according to some embodiments of the present disclosure. FIG. 6 shows intelligent selection engine 218, DNS 120, SGW 112, PGW 114, MME 116, DNS 120 to MME 116 interface 602, MME 116 to intelligent selection engine 218 interface 602, DNS 120 to intelligent selection engine 218 interface, intelligent selection engine 218 to SGW 112 interface 608, and SGW 112 to PGW 114 interface 610.

Intelligent selection engine 218 runs as a micro-service or on a standalone node (e.g., virtualized node or chassis based node on the cloud). Intelligent selection engine 218 interfaces with DNS 120 using DNS queries 606 and with MME 116 using S11/Access and GTP-v2. As described in more detail below, MME 116 queries DNS 120 to select an SGW 112 for a given UE 102 session, intelligent selection engine 218 sniffs CreateSessionRequest GTP-C packets from MME 116 and overrides MME's chosen SGW/PGW IP addresses in CreateSessionRequest messages based on availability and load of the SGWs and PGWs. Intelligent selection engine 218 interfaces with SGW 112 over S11/Core and GTP v-2 and SGW 112 interface with PGW 114 over S5/S8 and GTP-v2.

Figure 7:
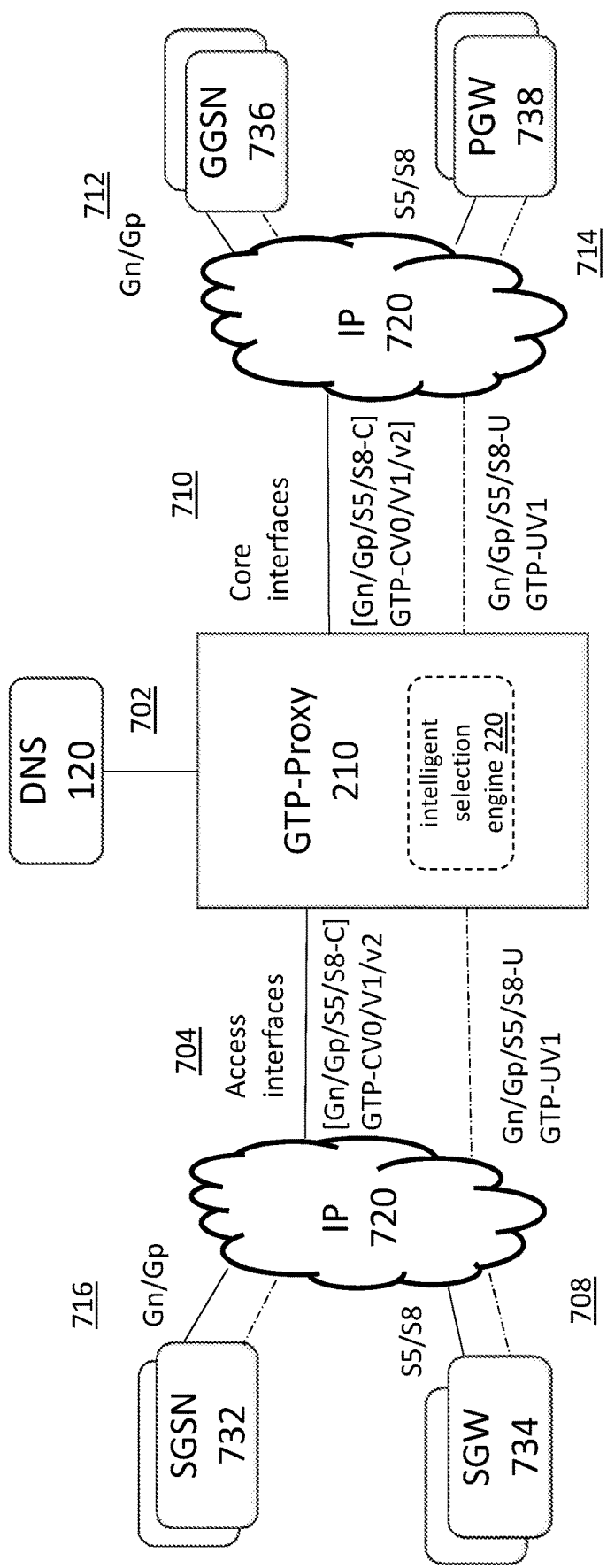
FIG. 7 is a system diagram showing a GTP-proxy including an intelligent selection engine, according to some embodiments of the present disclosure.

FIG. 7 is a system diagram showing a GTP-proxy including an intelligent selection engine, according to some embodiments of the present disclosure. FIG. 7 shows GTP-proxy 210 including intelligent selection engine 210, DNS 120, internet protocol (IP) 720, SGSN 732, SGW 734, GGSN 736, PGW 738, DNS 120 to GTP-proxy 210 interface 402, GTP-proxy 210 to IP 720 access interface 704, GTP-proxy 210 to IP 720 core interface 710, SGSN 732 to IP 720 interface, SGW 734 to IP 720 interface, GGSN 736 to IP 720 interface, and PGW 738 to IP 720 interface 714.

SGSN 732 and SGW 734 are similar to SGW/SGSN 112 and GGSN 736 and PGW 738 are similar to PGW/PGSN 114, except that SGSN 732, SGW 734, PGW 738, and PGSN 706 are shown as separate nodes in FIG. 7.

GTP-proxy 210 is inserted in between SSGN 702/SGW 734 and GGSN 736/PGW 738. GTP-proxy 201 includes an intelligent selection engine 210, which runs as a micro-service or library in GTP-proxy 210. The intelligent selection engine 210 can run as a container or virtual machine or on a blade within GTP-proxy 210. GTP-proxy 210 interfaces with DNS 120 using DNS queries 702. As described in more detail below, ePDG 204 queries DNS 120 to select a PGW 114 or GGSN 736 for a given UE 102 session based on availability and load of the PGWs and GGSNs and received SGSN and SGW information. From the query, DNS 120 can provide a list of nodes that can support the query. SGSN 732 interfaces with IP 720 over Gn/Gp 706, SGW 734 interfaces with IP 720 over S5/S8, GTP-proxy 210 interfaces with IP 720 over either Gn/Gp/S5/S8-C and GTP-CV0/V1/v2 or Gn/Gp/S5/S8-U and GTP-UV1 on the access interface side 704 and on the core interface side 706, IP 720 interfaces with GGSN over Gn/Gp and with PGW 738 over S5/S8. The solid line refers to a control plane interface and the dashed line refers to a user plane interface.

Figure 8:
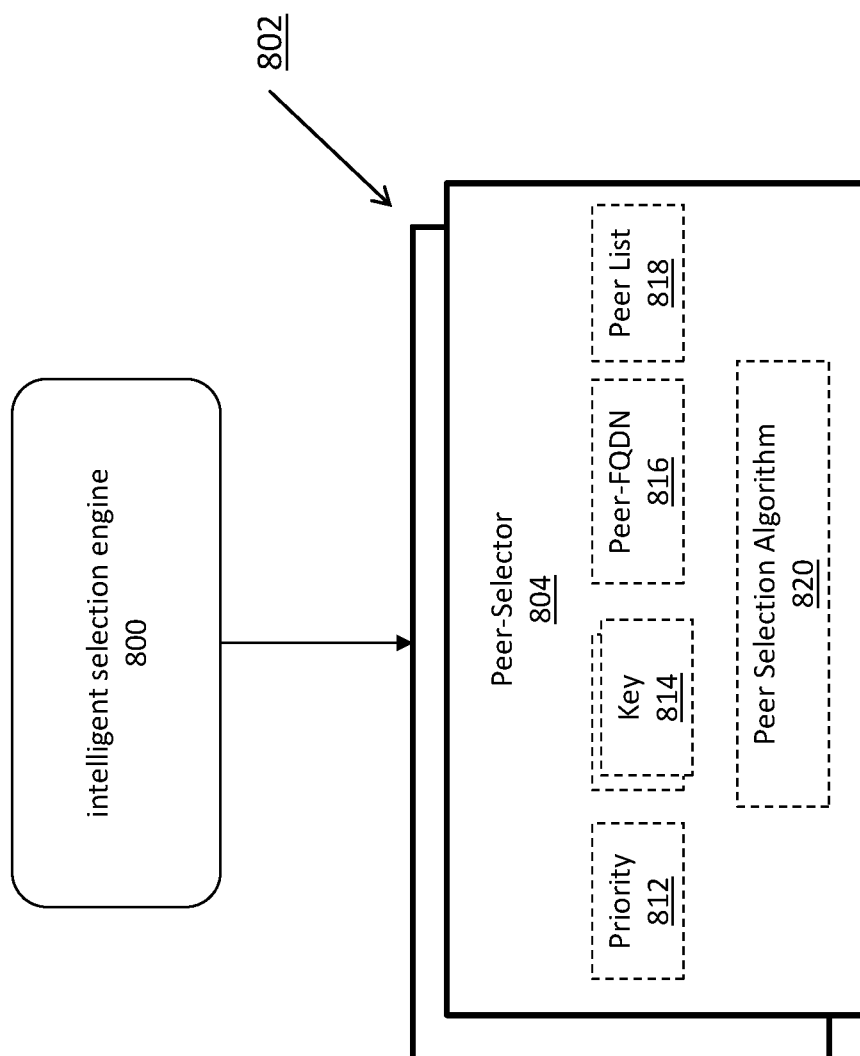
FIG. 8 is a diagram showing a peer selector, according to some embodiments of the present disclosure.

FIG. 8 is a diagram showing a peer selector, according to some embodiments of the present disclosure. FIG. 8 shows intelligent selection engines 212, 214, 216, 218, 220, subscriber analyzer 802, peer selector 804, priority 812, key 814, peer-FQDN (fully qualified domain name) 816, peer list 818, and peer selection algorithm 820.

Intelligent selection engines 212, 214, 216, 218, 220 each include similar modules and logic for selecting a peer and will be discussed collectively as intelligent selection engine 800. Intelligent selection engine 800 includes a peer selector 804. The peer selector can be one of many modules, or subscriber analyzers 802, available to the intelligent selection engine 800. As described in more detail below, a peer selector 804 can be chosen by the intelligent selection engine 800. The peer selector 804 then chooses a peer node based on availability and load of the peer nodes. An intelligent selection engine 800 can be associated with one or more peer selectors 804.

Peer selectors 804 can be provisioned by an operator based on a use case or workflow. Each peer selector 804 can have one or more keys 814. In some embodiments, each key 814 can be expressed as a key pair (e.g., {key-type, key-value}). Key 814 can identify a type of service (e.g., LTE release type, location, GTP-proxy name). For example, for a GTP-proxy, keys can include apn-name, gtp-proxy-name, eutran-cell-global-id, home-plmnid, imei-range, imsi-range, rat-type, routing-area-id, service-area-id, serving-nw-plmnid, tracking-area-id, ue-ip-address and serving-nw-mcc. Keys can be combined using OR and AND operations. For example, peer selectors can be chosen based on keys matching both LTE release type and location. Priority 812 indicates an ordering in which a peer selector 804 is chosen over other peer selectors. For example, if two peer selectors have matching keys associated with a service, the peer selector with the higher priority is chosen.

Once a peer selector is chosen, then a peer is selected from one of the peer-FQDN 816 and peer list 818. As described in more detail below, if peer selector 804 maps to a peer-FQDN, intelligent selection engine 800 sends a DNS query to get a peer list associated with the peer-FQDN. If the peer selector is not mapped to a peer-FQDN or if a DNS server is not configured, peer selector can use a pre-defined peer list associated with the peer selector. Once the peer list is chosen, a peer from the peer list is chosen using the peer selection algorithm 820, which as described in more detail below, considers both peer availability and load.

Figure 9:
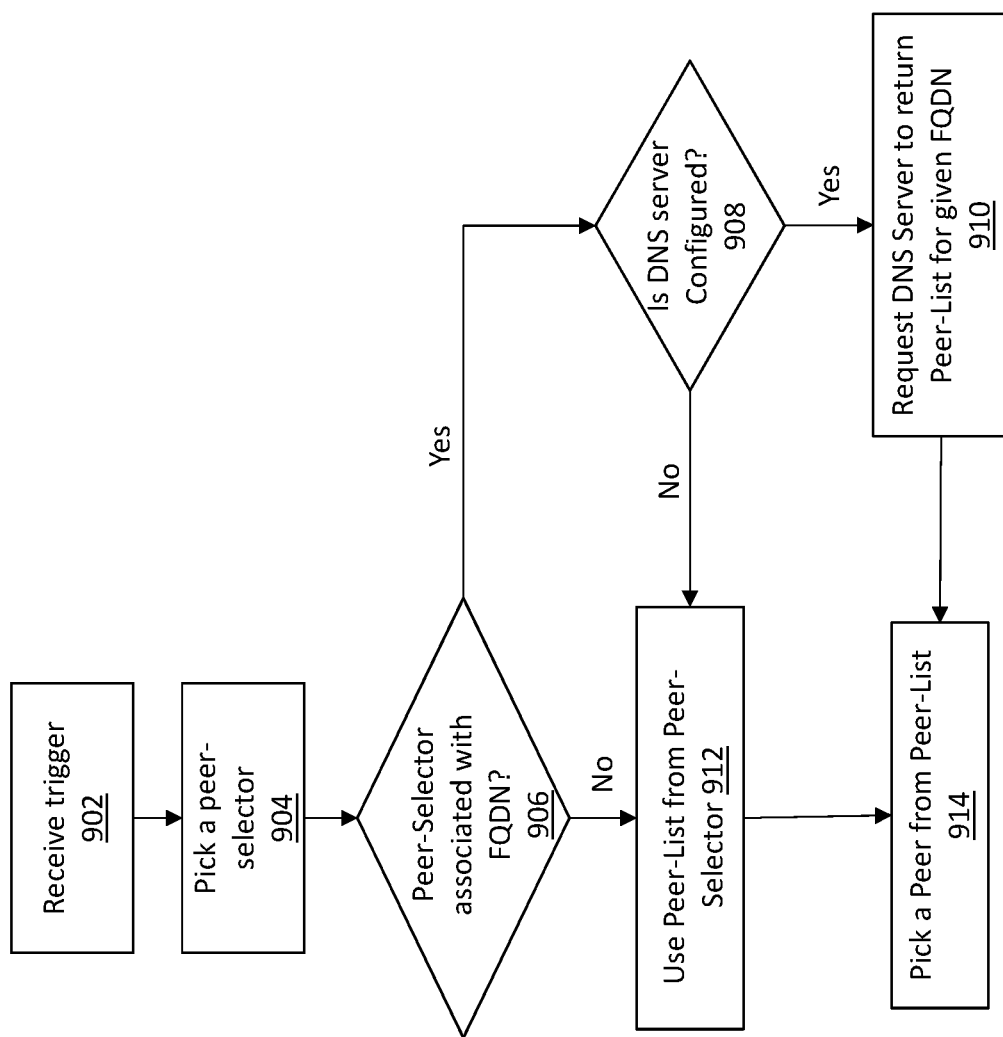
FIG. 9 is a flow chart showing a process of choosing a peer list, according to some embodiments of the present disclosure.

FIG. 9 is a flow chart showing a process of choosing a peer list, according to some embodiments of the present disclosure.

Referring to step 902, intelligent selection engine 800 receives a trigger to pick a peer node for a subscriber session. The trigger can include an indication of session traffic traversing a node associated with the intelligent selection engine 800 or a specific request to pick a peer node associated with the session traffic or provided by an operator.

Referring to step 904, intelligent selection engine 800 chooses a peer selector 804. In some embodiments, the peer selector 804 with the highest priority and matching subscriber keys is chosen. As part of choosing a peer selector, intelligent selection engine 800 can analyze subscriber session data to determine parameters that match its key types (e.g., location of the subscriber). In some embodiments, parameters in the subscriber session data are determined by another node and provided to intelligent selection engine 800. Once one or more peer selectors are chosen based on the peer selectors having key types matching the user subscriber parameters, a peer selector is chosen from the one or more peer selectors based on the peer selector having a higher priority. An example of peer selectors including matching keys with different priority levels includes selecting a primary peer if it's reachable; otherwise, selecting a secondary peer. The primary peer is associated to higher priority peer selector whereas secondary peer is associated to lower priority peer selector.

Referring to step 906, intelligent selection engine 800 determines whether the chosen peer selector is associated with an FQDN 906. In some embodiments, this association can be configured by an operator. If the chosen peer selector is associated with an FQDN, intelligent selection engine 800 determines if a DNS server is configured 908. In some embodiments, a DNS server is configured when primary or secondary DNS services are provisioned and are reachable. If the DNS server is configured, intelligent selection engine 800 requests the DNS server to return a peer-list associated with the FQDN 910. If the DNS server is not configured of if the peer-selector is not associated with an FQDN, intelligent selection engine 800 uses a peer list from the peer selector 912. As noted above, the peer list from the peer selector 912 can be preconfigured by an operator or otherwise dynamically associated.

Referring to step 914, once a peer list is chosen, intelligent selection engine 800 chooses a peer from the peer list. As described in more detail below in FIG. 10 and the text accompanying FIG. 10, intelligent selection engine 800 chooses a peer using a peer selection algorithm that considers both peer availability and load.

Figure 10:
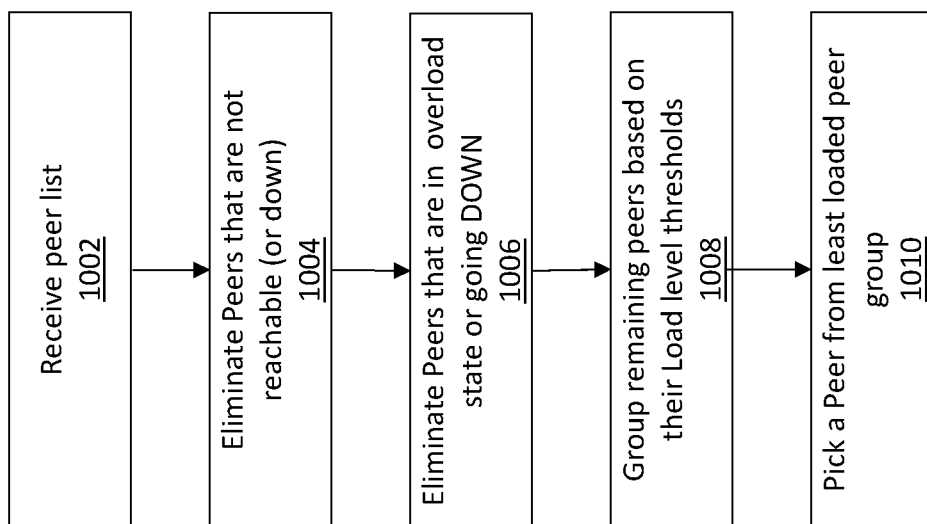
FIG. 10 is a flow chart showing a process of choosing a peer from a peer list, according to some embodiments of the present disclosure.

FIG. 10 is a flow chart showing a process of choosing a peer from a peer list, according to some embodiments of the present disclosure.

Referring to step 1002, intelligent selection engine 800 receives a peer list (e.g., that is chosen in a manner described above in FIG. 9).

Referring to step 1004, intelligent selection engine 800 eliminates peers from the peer list that are not reachable. Peers can be considered unreachable if a peer has failed, is intentionally brought down for maintenance or update, or loses connection with the network for some other reason. Intelligent selection engine 800 determines which peers are not reachable by receiving messages from other nodes regarding the status of peers. Other nodes can determine the status of peers by sending a heartbeat message to a peer to test if a link is still active.

Referring to step 1006, intelligent selection engine 800 eliminates peers from the peer list that are in overload or going down. Peers can be considered in overload if a peer has reached or is reaching maximum capacity or are experiencing software corruption issues. Intelligent selection engine 800 determines which peers are overloaded or going down by in a similar manner it detects whether a peer is reachable. For example, intelligent selection engine 800 can determine which peers are in overload by receiving messages from other nodes regarding the status of peers. Other nodes can determine the status of peers by sending a heartbeat message to a peer to test if a peer is overloaded. A peer can also be eliminated based on an administrative instruction. For example, if a node is being repaired or upgraded, a node can be taken down and perceived as the intelligent selection engine 800 as unavailable.

Referring to step 1008, intelligent selection engine 800 groups remaining peers based on their load level thresholds. For example, peers can be associated with different loads (e.g., in terms of actual load, percentage of total capacity or load level) and associated load levels (e.g., low, medium, or high load levels). Load levels can be determined from a load. For example, a peer with a high percentage of total capacity can be associated with a high load level. A load level threshold can be preset or determined based on a combination of a load and load level associated with each node. For example, peers associated with a low level may have a load level threshold of 30%; peers associated with a medium load level may have a load level threshold of 60%; and peers associated with a high load level may have a load level threshold of 90%. The percentages can be preset or can be determined based on clusters of peers observed in a system. For example, load levels can be determined based on average loads associated with peers, or median loads associated with peers within distinct groups, or other similar methods. A number of groups or deviation around a threshold can be determine for grouping purposes. Other grouping techniques can also be used (e.g., clustering, Bayesian classification). In some embodiments, one result of the grouping is to establish groups of peers from least loaded to most loaded.

Referring to step 1010, intelligent selection engine 800 chooses a peer from the least loaded peer group. The process for choosing a peer from a least loaded peer group can include round robin, weighted round robin, or hashing.

In addition to load balancing capabilities, GTP-proxy with intelligent selection engine 220 can also be used to hide network topology, translate session information between different LTE release formats, map APNs, and provide enhanced charging capabilities. GTP-proxy 210 is hardware and hypervisor agnostic, and can be integrated with hardware and hypervisors such as HPC7000, DL360/380, IBM Pureflex, ATCA, VMWare, KVM, and Openstack. In some embodiments, the functions of GTP proxy 210 can be virtualized and virtual machines can be added to a GTP proxy cluster without impacting other network elements. GTP proxy 210 can include three different types of virtual machines: management control module (MCM), control plane module (CPM), and subscriber session module (SSM). The MCM is responsible for the general operation and management of the GTP-Proxy, including operations, administration and management (OA&M), command line interface (CLI), and network configuration protocol (NETCONF). CPM is responsible for dynamic routing, session management, GTP-C, call control, OFCS clients, and OCS clients. SSM is responsible for logical IP interface termination, bearer GTP-U tunnel termination, and charging. In some embodiments, intelligent selection engine 220 can be run on the CPM.

Figure 11:
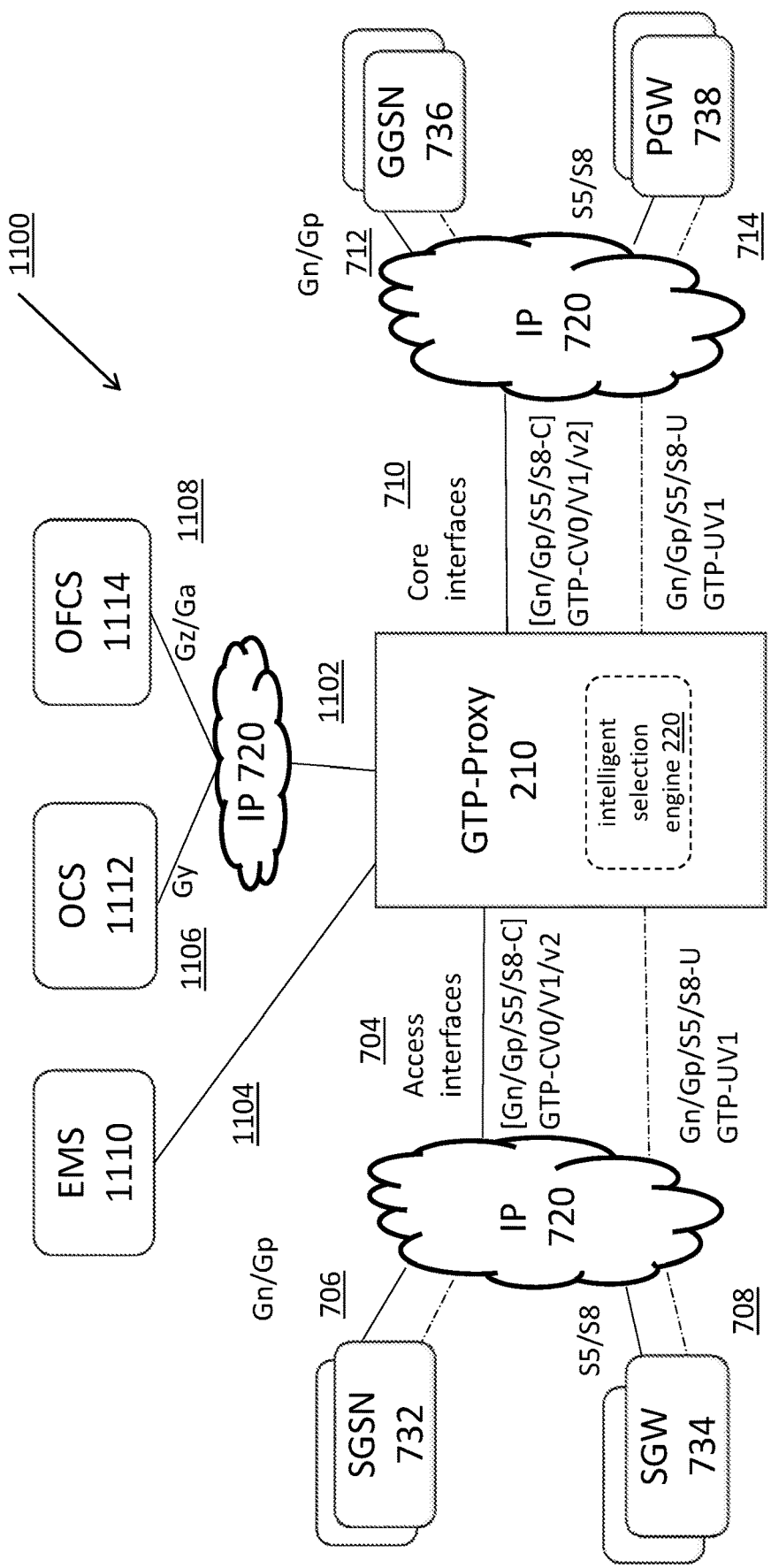
FIG. 11 is a system diagram showing a networked system including a GTP-proxy with an intelligent selection engine, according to some embodiments of the present disclosure.

FIG. 11 is a system diagram showing a networked system including a GTP-proxy with an intelligent selection engine, according to some embodiments of the present disclosure. The networked system 1100 shows GTP-proxy 210 including intelligent selection engine 220, internet protocol (IP) 720, SGSN 732, SGW 734, GGSN 736, PGW 738, enhanced messaging service (EMS) 1110, online charging system (OCS) 1112, offline charging system (OFCS) 1114, GTP-proxy 210 to IP 720 access interface 704, GTP-proxy 210 to IP 720 core interface 710, SGSN 732 to IP 720 interface 706, SGW 734 to IP 720 interface 708, GGSN 736 to IP 720 interface 712, PGW 738 to IP 720 interface 714, GTP Proxy 210 to IP 720 interface 1102, GTP Proxy 210 to EMS 1110 interface 1104, IP 720 to OCS 1112 interface 1106, and IP 720 to OFCS 1114 interface 1108.

EMS 1110 interfaces with GTP-proxy 210 over a NETCONF interface 1104. EMS 1110 is a messaging service that is an extension to short message service (SMS). EMS 1110 is similar to multimedia message service (MMS) in that it supports messages that contain both text and multimedia messages (e.g., audio, video, images). In contrast to MMS, EMS messages can be received by devices configured only to receive SMS messages. While EMS 1110 is shown in the figure, GTP proxy can also interface with MMS and SMS.

IP 720 interfaces with GTP-proxy 210 over IP Internet protocol 1102, which connects GTP-proxy 210 with OCS 1112 and OFCS 1114. IP 720 is a router which is positioned in between GTP-proxy 210 and other network nodes. In some embodiments, GTP-proxy 210 is directly connected to other network nodes and there is no router present in between GTP-proxy 210 and other network nodes. OCS 1112 and OFCS 1114 interface with IP 720 over Gy 1106 and Gz/Ga 1108, respectively. OCS 1112 allows an operator to charge a subscriber in real time for data usage. OFCS 1114 generates billing records based on a subscriber's data usage. Both OCS 1112 and OFCS 1114 allow for event-based and session-based charging.

As described in more detail below, having GTP-proxy 210 with an intelligent session engine 220 located in between SGSN 732/SGW 734 and GGSN 736/PGW 738 can be advantageous because of topology hiding and flexibility in choosing gateway nodes. For example, by moving the selection process of gateway nodes from an MME to GTP-proxy 210 allows for different gateway nodes to be selected without reconfiguring a DNS.

Figure 12:
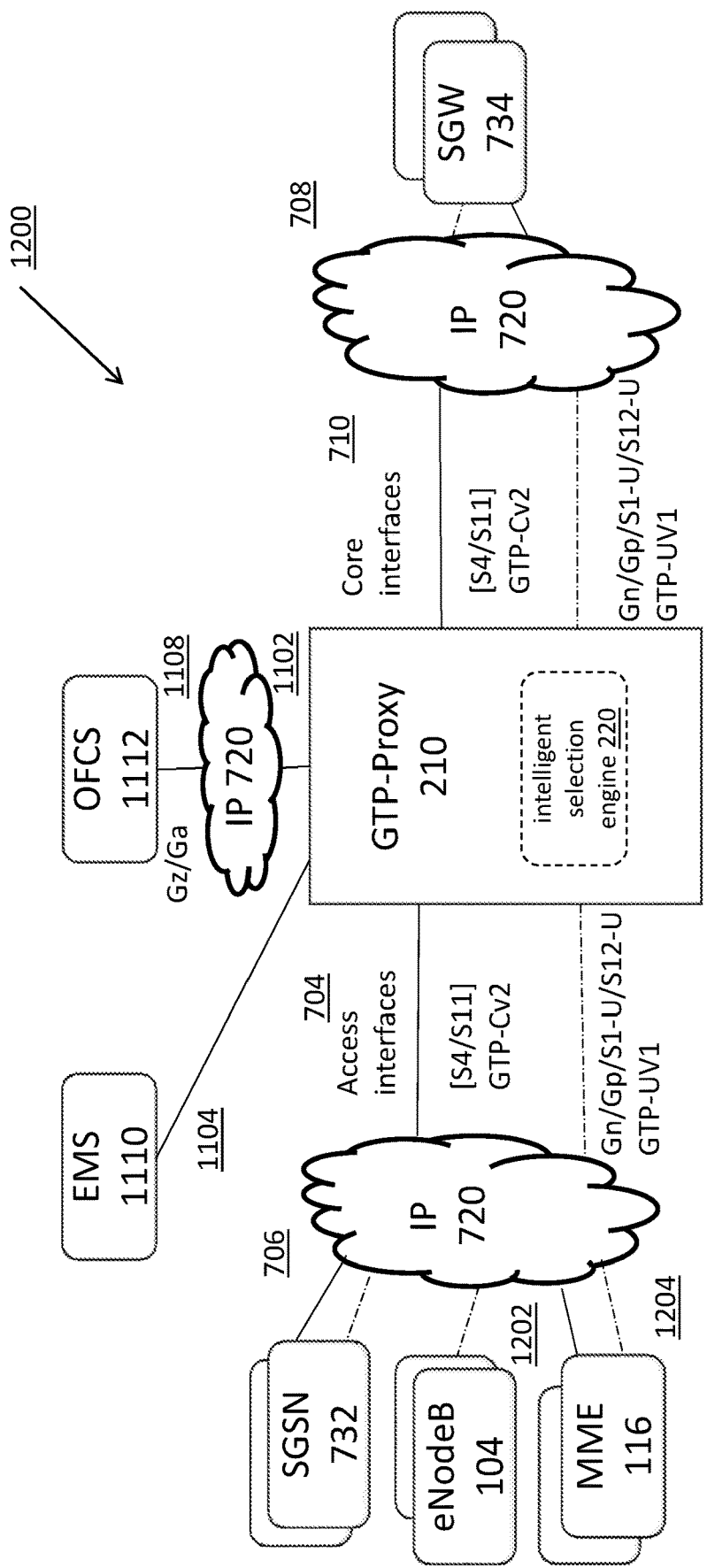
FIG. 12 is a system diagram showing a networked system including a GTP-proxy with an intelligent selection engine, according to some embodiments of the present disclosure.

FIG. 12 is a system diagram showing a networked system including a GTP-proxy with an intelligent selection engine, according to some embodiments of the present disclosure. The networked system 1200 shows GTP-proxy 210 including intelligent selection engine 220, internet protocol (IP) 720, SGSN 732, SGW 734, enhanced messaging service (EMS) 1110, offline charging system (OFCS) 1114, GTP-proxy 210 to IP 720 access interface 704, GTP-proxy 210 to IP 720 core interface 710, SGSN 732 to IP 720 interface 706, SGW 734 to IP 720 interface 708, eNodeB to IP 720 interface 1202, MME 116 to IP 720 interface 1204, GTP Proxy 210 to IP 720 interface 1102, GTP Proxy 210 to EMS 1110 interface 1104, IP 720 to OFCS 1114 interface 1108.

eNodeB 104 interfaces with IP 720 over IP Internet protocol 1202. MME interfaces with IP 720 over IP Internet protocol 1204.

As described in more detail below, the systems shown in FIGS. 11 and 12 taken together, and in particular, the position and capabilities of GTP-proxy, allow for at least the following: 1) topology hiding and flexibility in adding, deleting or moving network elements to different locations in the network without having to change DNS settings, 2) session state aware processing that generates call data records (CDRs) that facilitate reconciliation with SGW/ SGSN/PGW/GGSN billing records, 3) enhanced SGW/ PGW/GGSN (peer) Selector based on peer reachability, peer load, peer overload, and UE session attributes (radio access technology (RAT) type, APN Name, location, and mobile country code (MCC)/mobile network code (MNC)), 4) APN manipulation, such as grouping multiple UE APNs to a single APN name, 5) interworking of different network elements with different standard releases by adding/suppressing GTP information elements (IEs), 6) allow/reject selected GTP procedures (e.g., GTP V0, dedicated bearers), 7) flexibility in adding/deleting GTP peers (SGW/PGW), and 8) enable workflow services (e.g., deep packet inspection (DPI), quality of service (QoS) enforcement).

Figure 13:
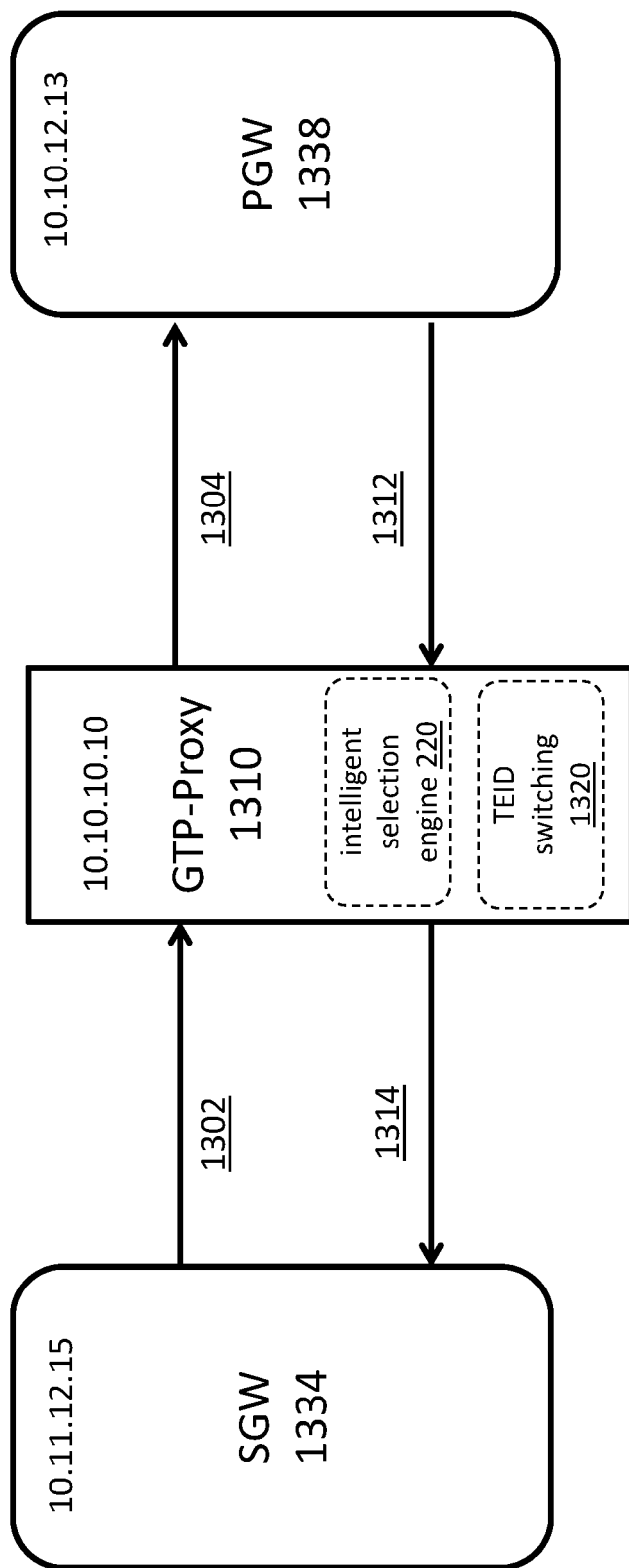
FIG. 13 is a diagram showing a GTP-proxy located between an SGW and a PGW for implementing a create session request, according to some embodiments of the present disclosure.

FIG. 13 is a diagram showing a GTP-proxy located between an SGW and a PGW for implementing a create session request, according to some embodiments of the present disclosure. In this exemplary embodiment, SGW 1334 has an IP of 10.11.12.15, GTP-proxy 1310 has an IP address of 10.10.10.10, and PGW 1338 has an IP address of 10.10.12.13. Other than having assigned IP addresses, SGW 1334, GTP-proxy 1310, PGW 1338 have the same function and structure as SGW 734, GTP-Proxy 210, and PGW 738, respectively. FIG. 13 also shows create session request 1302, create session request 1304, create session response 1312, and create session response 1314.

Create session request 1312, which is transmitted from SGW 1334 to GTP-proxy 1310, includes the information below:
  Create Session Request
  GTP Header TEID 0
  Dest PGW IP 10.10.10.10
  Sender FTEID IP 10.11.12.15
  Sender FTEID TEID 500

GTP Header TEID refers to a tunnel endpoint identifier associated with the create session request message. The GTP Header TEID identifies an address of the recipient of a communication during a session. Each session and recipient can be associated with a different GTP Header TEID. In some embodiments, the GTP Header TEID can be reused after a period of time (e.g., expiration of a timer). GTP Header TEID usually has a value of "0" when the recipient TEID is unknown at the time of session setup.

Dest PGW IP refers to a destination PGW IP address. As shown above, the destination PGW IP address is 10.10.10.10, which is the IP address of the GTP-proxy 1310, rather than the IP address of PGW 1338, which is 10.10.12.13. As described in more detail below, having GTP-proxy intercept the create session request from SGW 1334 allows GTP proxy to further analyze, translate, and direct session requests.

Sender FTEID IP refers to a sender's fully qualified endpoint identifier IP address. This is the IP address associated with the transmitting node, which in this case is SGW 1334 with an IP address of 10.11.12.15.

Sender FTEID TEID refers to a sender's fully qualified endpoint identifier tunnel endpoint identifier. The Sender FTEID TEID is similar to the GTP Header TEID, except that it identifies a particular session associated with the sender, rather than a session associated with the recipient.

GTP-proxy 1310, after receiving create session request 1302, transmits the following create session request 1304 to PGW 1338:
  Create Session Request
  GTP Header TEID 0
  Dest PGW IP 10.10.12.13
  Sender FTEID IP 10.10.10.10
  Sender FTEID TEID 530

GTP Header TEID is 0. As described above, the GTP Header TEID is 0 because the recipient TEID is unknown (as this is a create session request).

Dest PGW IP is 10.10.12.13, which is the IP address of PGW 1338. Sender FTEID IP is 10.10.10.10, which is the address of the GTP-proxy 1310.

PGW 1338, after receiving create session request 1304, transmits the following create session response 1312 to GTP-proxy 1310:
  Create Session Response
  GTP Header TEID 530
  Dest SGW IP 10.10.10.10
  Sender FTEID IP 10.10.12.13
  Sender FTEID TEID 910

GTP Header TEID is 530, which is the ID associated with GTP proxy.

Dest SGW IP refers to a destination SGW IP address. As shown above, the destination SGW IP address is 10.10.10.10, which is the IP address of the GTP-proxy 1310, rather than the IP address of SGW 1334, which is 10.11.12.15. As described in more detail below, having GTP-proxy 1310 intercept the create session response from PGW 1338 allows GTP proxy to further analyze, translate, and direct session responses.

Sender FTEID IP is 10.10.12.13, which is the IP address of PGW 1338. Sender FTEID TEID is 910, which is the tunnel ID for of the PGW.

GTP-proxy 1310, after receiving create session response 1312, transmits the following create session response 1314 to SGW 1334:
Create Session Response
GTP Header TEID 500
Dest SGW IP 10.11.12.15
Sender FTEID IP 10.10.10.10
Sender FTEID TEID 550

GTP Header TEID is 500, which is different from the GTP Header TEID in create session response 1312.

Dest SGW IP is 10.11.12.15, which is the IP address of SGW 1334. Sender FTEID IP is 10.10.10.10, which is the address of the GTP-proxy 1310. Sender FTEID TEID, which is 550, is the tunnel ID of the GTP proxy 1310.

Figure 14:
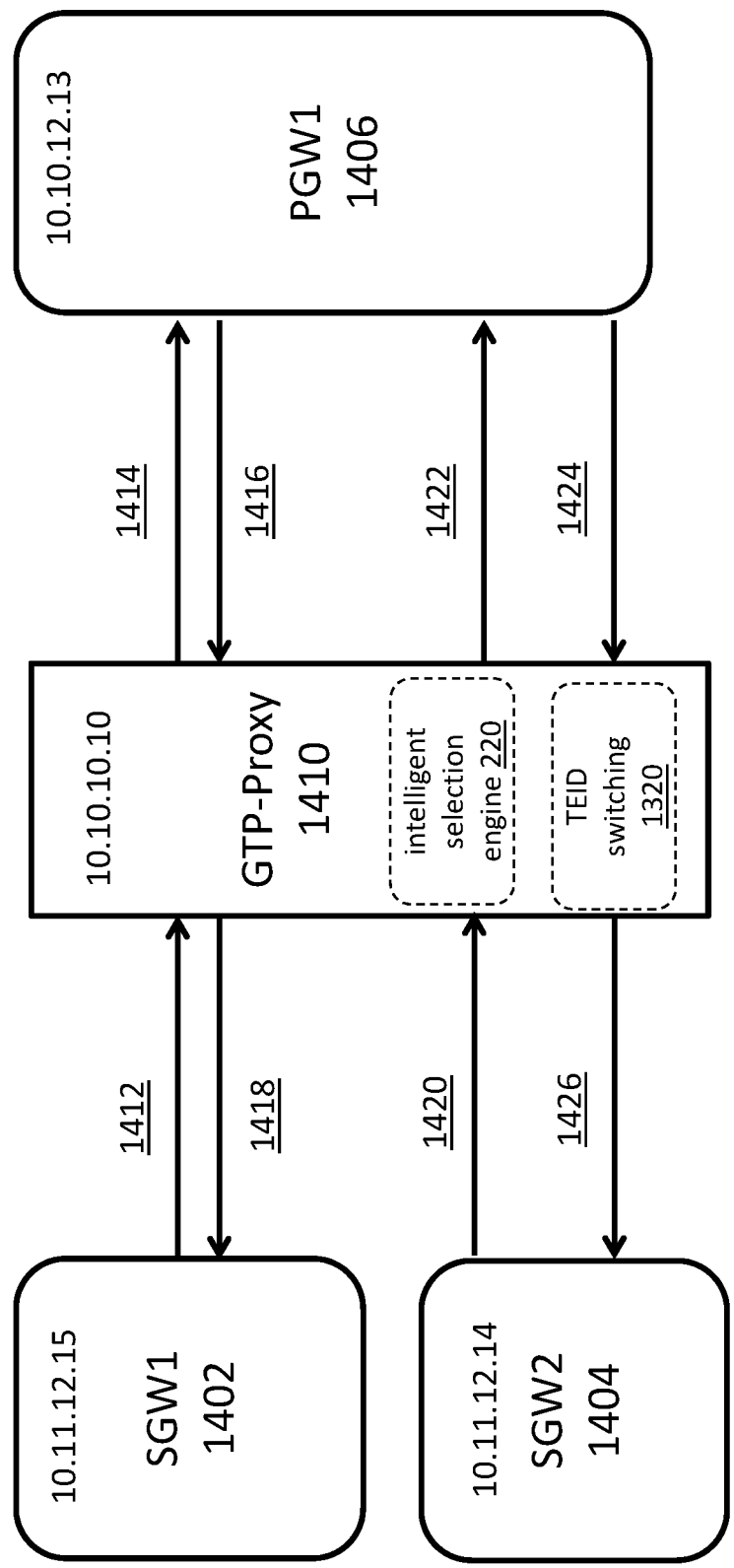
FIG. 14 is a diagram showing a GTP-proxy located between two SGWs and a PGW for implementing an intra 4G-handoff with SGW change, according to some embodiments of the present disclosure.

FIG. 14 is a diagram showing a GTP-proxy located between two SGWs and a PGW for implementing an intra 4G-handoff with SGW change, according to some embodiments of the present disclosure. In this exemplary embodiment, SGW1 1402 has an IP of 10.11.12.15, SGW2 1404 has an IP of 10.11.12.14, GTP-proxy 1410 has an IP address of 10.10.10.10, and PGW 1406 has an IP address of 10.10.12.13. Other than having assigned IP addresses, SGW1 1402/SGW2 1404, GTP-proxy 1410, PGW 1406 have the same function and structure as SGW 734, GTP-Proxy 210, and PGW 738, respectively. FIG. 14 also shows create session request 1412, create session request 1414, create session response 1416, create session response 1418, modify bearer request 1420, modify bearer request 1422, modify bearer response 1424, and modify bearer response 1426.

Create session request 1412, create session request 1414, create session response 1416, and create session response 1418 have the same content and function similarly as create session request 1302, create session request 1304, create session response 1312, and create session response 1314. The description of create session request 1302, create session request 1304, create session response 1312, and create session response 1314 applies to create session request 1412, create session request 1414, create session response 1416, and create session response 1418.

Modifier bearer request 1420, which is transmitted from SGW2 1404 to GTP-proxy 1410, includes the information below:
Modify Bearer Request
GTP Header TEID 550
Sender FTEID IP 10.11.12.14
Sender FTEID TEID 600
Dest PGW IP 10.10.10.10

As described above, GTP Header TEID refers to a tunnel endpoint identifier associated with the modify bearer request message.

Dest PGW IP refers to a destination PGW IP address. As shown above, the destination PGW IP address is 10.10.10.10, which is the IP address of the GTP-proxy 1410, rather than the IP address of PGW1 1406, which is 10.10.12.13. As described in more detail below, having GTP-proxy intercept the modify bearer request from SGW 1404 allows GTP proxy to further analyze, translate, and direct session requests.

Sender FTEID IP refers to a sender's fully qualified endpoint identifier IP address. This is the IP address associated with the transmitting node, which in this case is SGW 1404 with an IP address of 10.11.12.14.

Sender FTEID TEID refers to a sender's fully qualified endpoint identifier tunnel endpoint identifier. The Sender FTEID TEID is 600, which is the tunnel ID of the GTP proxy.

GTP-proxy 1410, after receiving modify bearer request 1420, transmits the following modify bearer request 1422 to PGW1 1406:
Modify Bearer Request
(New PLMNID/ULI/RAT/TEID)
GTP Header TEID 910
Sender FTEID TEID 540

GTP Header TEID is 910 Sender FTEID TEID is 540.

GTP-proxy 1410 can specify a new PLMID, ULI, RAT, or TEID.

PGW 1406, after receiving modify bearer request 1422, transmits the following modify bearer response 1424 to GTP-proxy 1410:
Modify Bearer Response
GTP Header TEID 540
Dest SGW IP 10.10.10.10

GTP Header TEID is 540.

As described above, Dest SGW IP refers to a destination SGW IP address. As shown above, the destination SGW IP address is 10.10.10.10, which is the IP address of the GTP-proxy 1410, rather than the IP address of SGW 1404, which is 10.11.12.14. As described in more detail below, having GTP-proxy 1410 intercept the modify bearer response from PGW 1406 allows GTP proxy to further analyze, translate, and direct session responses.

GTP-proxy 1410, after receiving modify bearer response 1424, transmits the following modify bearer response 1426 to SGW2 1404:
Modify Bearer Response
GTP Header TEID 600
Dest SGW IP 10.11.12.14

GTP Header TEID is 600, which is different from the GTP Header TEID in modify bearer response 1424.

Dest SGW IP is 10.11.12.14, which is the IP address of SGW2 1404. Sender FTEID IP is 10.10.10.10, which is the address of the GTP-proxy 1410.

Figure 15:
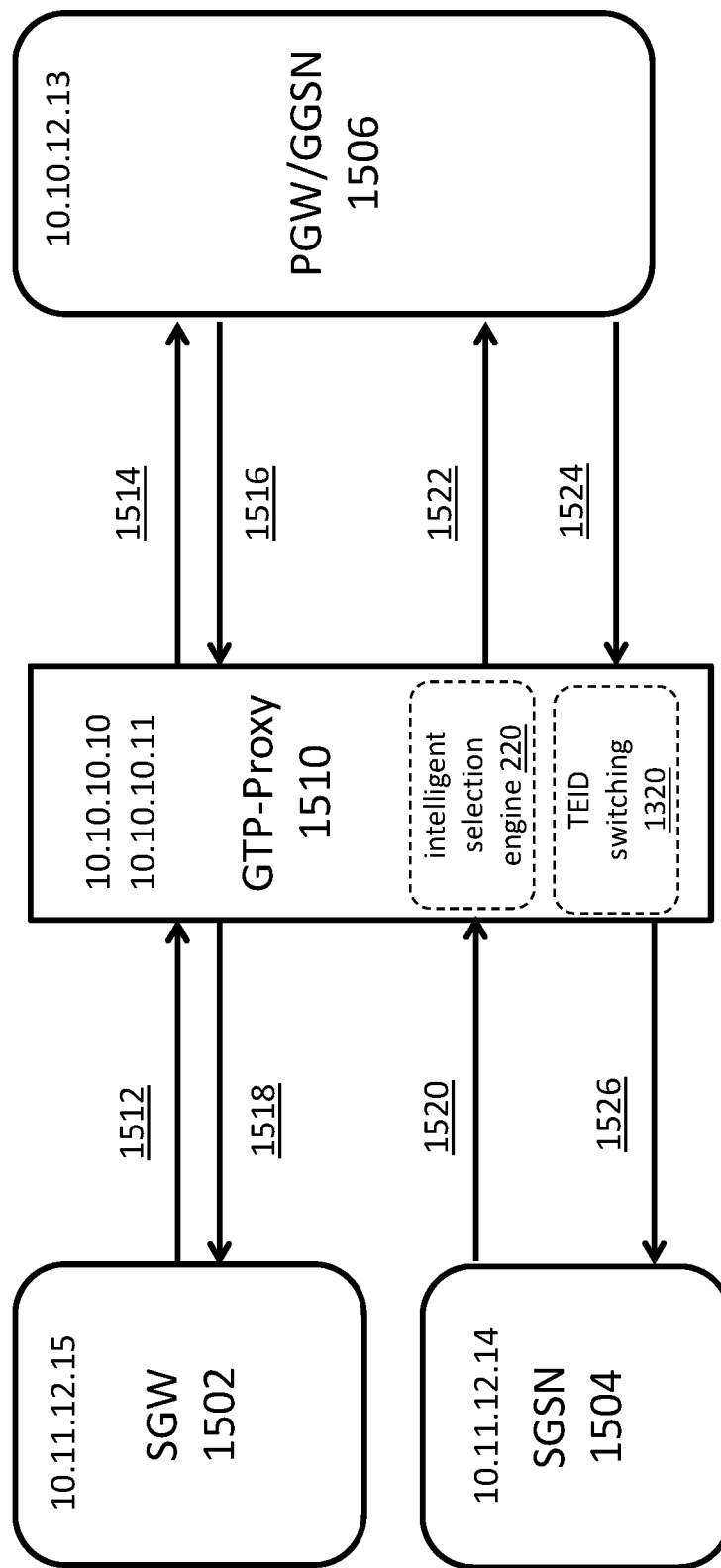
FIG. 15 is a diagram showing a GTP-proxy located between two SGWs and a PGW for implementing a 4G to 3G handoff, according to some embodiments of the present disclosure.

FIG. 15 is a diagram showing a GTP-proxy located between two SGWs and a PGW for implementing a 4G to 3G handoff, according to some embodiments of the present disclosure. In this exemplary embodiment, SGW 1502 has an IP of 10.11.12.15, SGSN 1504 has an IP of 10.11.12.14, GTP-proxy 1510 has an IP address of 10.10.10.10 and 10.10.10.11, and PGW 1506 has an IP address of 10.10.12.13. Other than having assigned IP addresses, SGW 1502, SGSN 1504, GTP-proxy 1510, PGW 1506 have the same function and structure as SGW 734, SGSN 732, GTP-Proxy 210, and PGW 738, respectively. FIG. 15 also shows create session request 1512, create session request 1514, create session response 1516, create session response 1518, update PDP context request 1520, update PDP context request 1522, update PDP context response 1524, and update PDP context response 1526.

Create session request 1512, create session request 1514, create session response 1516, and create session response 1518 have the same content and function similarly as create session request 1302, create session request 1304, create session response 1312, and create session response 1314. The description of create session request 1302, create session request 1304, create session response 1312, and create session response 1314 applies to create session request 1512, create session request 1514, create session response 1516, and create session response 1518.

Update PDP context 1520, which is transmitted from SGSN 1504 to GTP-proxy 1510, includes the information below:
Update PDP Contest Request
GTP Header TEID 550
Sender FTEID IP 10.11.12.14
Sender FTEID TEID 600
Dest GGSN IP 10.10.10.10

As described above, GTP Header TEID refers to a tunnel endpoint identifier associated with the update PDP context request message. The GTP Header TEID has a value of 550.

Dest GGSN IP refers to a destination GGSN IP address. As shown above, the destination GGSN IP address is 10.10.10.10, which is the IP address of the GTP-proxy 1510. As described in more detail below, having GTP-proxy intercept the update PDP context request from SGSN 1504 allows GTP proxy 1510 to translate a request initially intended for a GGSN node to PGW 1506.

Sender FTEID IP refers to a sender's fully qualified endpoint identifier IP address. This is the IP address associated with the transmitting node, which in this case is SGSN 1504 with an IP address of 10.11.12.14.

Sender FTEID TEID refers to a sender's fully qualified endpoint identifier tunnel endpoint identifier. The Sender FTEID TEID is 600.

GTP-proxy 1510, after receiving update PDP context request 1520, transmits the following update PDP context request 1522 to PGW 1506:
Update PDP Context Request
(New PLMNID/ULI/RAT/TEID)
GTP Header TEID 910
Sender FTEID IP 10.10.10.11
Sender FTEID TEID 540

GTP Header TEID is 910, which is different from the GTP Header TEID in update PDP context request 1520. Sender FTEID TEID is 540.

GTP-proxy 1510 can specify a new PLMID, ULI, RAT, or TEID.

PGW 1506, after receiving update PDP context request 1522, transmits the following update PDP context response 1524 to GTP-proxy 1510:
Update PDP Context Response
GTP Header TEID 540
Dest SGSN IP 10.10.10.11
GTP Header TEID is 540.

As described above, Dest SGSN IP refers to a destination SGSN IP address. As shown above, the destination SGSN IP address is 10.10.10.10, which is the IP address of the GTP-proxy 1510, rather than the IP address of SGSN 1504, which is 10.11.12.14. As described in more detail below, having GTP-proxy 1410 intercept the update PDP context response from PGW 1406 allows GTP proxy to translate a response from PGW 1506 to a response that can be received by SGSN 1504.

GTP-proxy 1510, after receiving update PDP context response 1524, transmits the following update PDP context response 1526 to SGSN 1504:
Update PDP Context Response
GTP Header TEID 600
Dest SGSN IP 10.11.12.14
GTP Header TEID is 600, which is different from the GTP Header TEID in update PDP context response 1524.

Dest SGSN IP is 10.11.12.14, which is the IP address of SGSN 1504.

FIG. 16 is a table showing parameters a GTP proxy maintains in order to switch tunnels when processing GTP-U and GTP-C traffic, according to some embodiments of the present disclosure. FIG. 16 shows packet type 1602, network element type 1604, network element TEID 160, GTP Proxy TEID 1608, network element restart counter 1610, and GTP proxy restart counter 1612.

Packet type 1602 refers to whether a packet is a GTP-U (data traffic) or a GTP-C (e.g., a signaling message).

GTP proxy TEID 1608 refers to a tunnel endpoint identifier for the GTP proxy. As described in more detail below, each unique combination of packet type, network element type, and TEID is associated with a unique GTP proxy TEID.

A GTP entity (e.g., PGW or SGW or GTP Proxy) maintains two restart counters. One is network element restart counter 1610, which is the counter sent by the peer, and the other is a GTP proxy restart 1612, which is the GTP proxy's own counter. When the entity restarts, it immediately increments its restart counter and sends the new value in subsequent echo requests or responses.

Network element type 1604 and network element TEID 1606 associates a TEID with a network element.

For example, when a GTP-C packet is received from SGW1 and forwarded to PGW1, GTP Proxy will set the TEID value in the header to 506.

When a GTP-C packet received from PGW1 is forwarded to SGW1, GTP Proxy will set the TEID value in the header to 502

GTP Proxy also maintains the restart counter values of peer nodes in the table for the GTP-C path. This value refers to the restart counter maintained by a GTP-C entity in non-volatile memory that is incremented each time a node reboots. The restart counters can be exchanged in echo request and response messages. When GTP-Proxy detects that the restart counter value received from a peer has changed, it can consider the peer node as a failed node and take actions to cleanup sessions accordingly.

Intelligent selection engine 220 includes a workflow analyzer 1604. The workflow analyzer 1604 can be one of many modules, or subscriber analyzers 802, available to the intelligent selection engine 220. For example, and as described above, another type of subscriber analyzer 802 available to intelligent selection engine 220 is a peer selector 804. As described in more detail below, a workflow analyzer 1604 can be chosen by the intelligent selection engine 220. The workflow analyzer 1604 then chooses a workflow based on matching keys 1614 and priority 1612. Intelligent selection engine 1604 can be associated with one or more workflow analyzers 1804.

Figure 17:
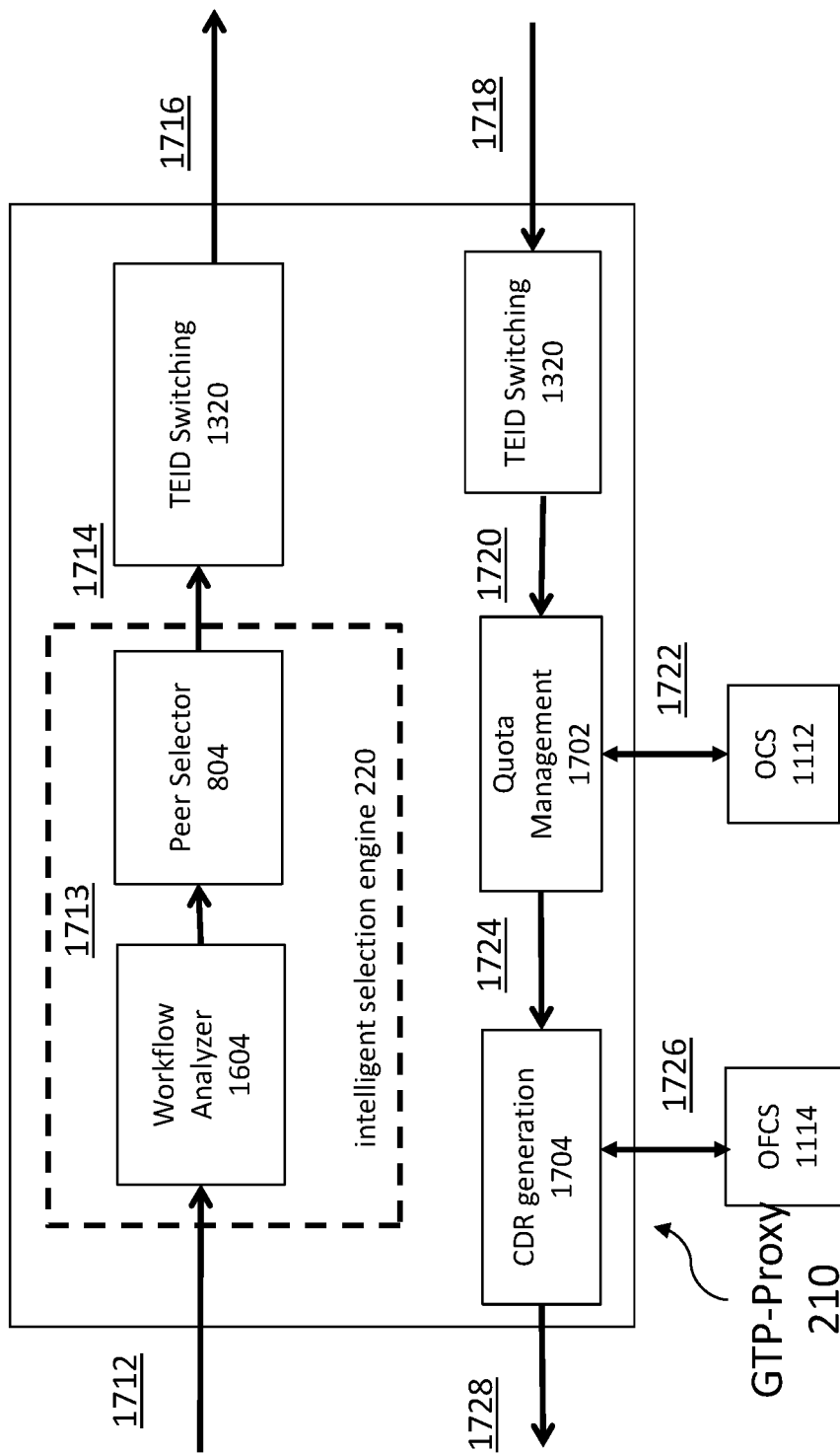
FIG. 17 is a flowchart showing a processing of a create session request, according to some embodiments of the present disclosure.

FIG. 17 is a flowchart showing a processing of a create session request, according to some embodiments of the present disclosure.

Referring to step 1712, GTP-proxy 210, after receiving create session request, sends it to the intelligent selection engine 220 where a PGW is chosen. In some embodiments, the create session request is routed directly to peer selector 804. The create session request can be received from either an SGW or MME.

In some embodiments, the create session request is routed first to workflow analyzer 1604 and then to peer selector 804. By way of example, create session request 1712 can include the following information:
Create Session Request
IMSI:12345678912345
Serving network MCC=310
Apn name=internet1

ISMI refers to an International Mobile Subscriber Identity, which is a unique number associated with a subscriber. Serving network MCC refers to the serving network mobile country code. Generally, each country has one mobile country code. Another field that can be specified is a mobile network code (MNC), which refers to a carrier network within the country. Usually each, MCC is associated with several MNCs.

APN name refers to an access point name associated with the create session request. An APN identifies a gateway between a mobile network and another network (e.g., the Internet). As shown above, the APN name for create session request 1712 is internet1. GTP proxy 210 processes the create session request using intelligent selection engine 220. Intelligent selection engine 220 extracts the APN name from the create session request and determines if the APN name matches a key 1614 associated with a workflow analyzer 1604. As described above, workflow analyzers 1604 are each associated with a key 1614. In this example, assume workflow analyzer 1604 has workflow analyzers associated with keys 1614 of "internet1," "internet2", and "internet3." After extracting APN name "internet1" from create session request 1712, intelligent selection engine 220, chooses a workflow analyzer with matching key 1614 "internet1." If there is more than one workflow analyzer 1604 with matching key 1614, intelligent selection engine 220 assigns the workflow analyzer with the highest priority 1612. An example of a matching workflow analyzer is shown below:

Analyzer-1
type=workflow-profile
key apn-name internet1
action control-profile WCP1
action data profile WDP1

As shown above, Analyzer 1, which is a workflow analyzer (i.e., "type=workflow profile), has a key apn name internet1. Analyzer 1 also is also associated with an action control profile and an action data profile. The action and control profile information are assigned to the subscriber's session to create a modified create session request 1713. Control profile contains control information associated with the create session request (e.g., what servers to contact, changes in APN name). Data profile is the data associated with the control information. In this example, control profile WCP1 is associated with "OCS1" and "OFCS1," which identify servers, and data profile is associated with "charging-profile1," which indicates a type of policy to apply at the identified server.

An example of a control profile mapping create session request 1712 to a different APN is shown below:Control-profile WCP1
  mapped apn name new-apn
  OCS interface OCSCHRG
  OFCS interface OFCSCHRG
  apn reporting type mapped
  allow-mapped-apn-based-sub-analyzer false As shown above, control profile WCP1 includes a line indicating a mapped apn name "new apn." New-apn refers to the apn name that the received apn name will be mapped to.

OCS interface OCSHRG refers to the online charging system interface that is used for online charging, quota management, credit control, etc.

OFCS interface OFCSCHRG refers to the offline charging server interface that offline billing records will be sent to.

apn reporting type mapped is a field that refers to which apn name (original or mapped) will be sent to external servers such as OFCS.

allow-mapped-apn-based-sub-analyzer false refers to whether the intelligent selection engine is run again based on the new apn name received after mapping the original apn.

The modified create session request 1713 is then sent to peer selector 804, where a peer node is chosen. In this example, intelligent selection engine 220 finds a peer selector 804 with a matching serving network MCC (e.g., 310). An exemplary matching peer selector 804 is shown below:

Analyzer-3
type=gtp-peer-selector
key serving-network-mcc 310
gtp-peer-list list1 (PGW-1, PGW-2, PGW-3)

As shown above, Analyzer 3 has a serving network mcc key with a value of 310, that matches the serving network MCC of create session request 1712 1713. Analyzer 3 is associated with the GTP peer list, "list 1," which includes PGW-1, PGW-2, and PGW-3. One of PGW-1, PGW-2, and PGW-3 is chosen based on the node's availability and load, or a round robin algorithm. Additional details regarding choosing between the PGW nodes is shown and described in FIGS. 8-10 above and accompanying text.

Referring to step 1714, in some embodiments, GTP-Proxy performs TEID switching using the TEID mapping table as described above in FIG. 16 to replace the TEID in the GTP header with that of the chosen PGW's. The GTP Proxy sends its own TEID in the Sender FTEID TEID field.

Referring to step 1716, create session request 1816 is transmitted to the chosen PGW (e.g., PGW1).

Referring to step 1718, GTP-proxy 210, after receiving create session response from PGW1, sends the message to the TEID switching module, to replace the TEID in the GTP header with that of the SGW that was associated with the create session request.

Referring to step 1720, the packet then passes through the quota management module 1702 where GTP-proxy 210, sends subscriber information to the OCS server 1112 to request for quota for the subscriber 1722. In some embodiments, there can be several OCS servers in the network. In the example provided above, quota management module 1702 exchanges messages with OCS server 1112 "OCS1," which is the server pointed to by the workflow control profile WCP1.

Referring to step 1724, after quota is successfully received, the packet then passes through CDR generation module 1704, which generates and sends offline charging records to the OFCS server 1114 1726. In the example provided above, CDR generation engine 1704 then communicates 1726 with OFCS server OFCS1 to generate billing records. OFCS1 is server pointed to by the workflow control profile WCP1.

Referring to step 1728, the create session response is then forwarded to either an SGW or MME.

GTP-proxy 210 with intelligent selection engine 220 can also be used for path management. GTP-Proxy 210 can initiate and support GTP-C and GTP-U path management procedures on access and core interfaces for both locally configured as well as dynamically learned peers. Dynamic peers can be learned upon receipt of Create Session/Create PDP requests and responses and path management procedures can be initiated if configured to do so. The node running GTP-Proxy service can also maintain its own recovery counter for path management. If GTP-Proxy 220 detects that the restart counter of an SGW has changed, it can run cleanup sessions on the PGW corresponding to the failed SGW. If GTP-Proxy detects that the restart counter of a PGW has changed, it can run cleanup sessions on the SGW/SGSN corresponding to the failed PGW.

Figure 18:
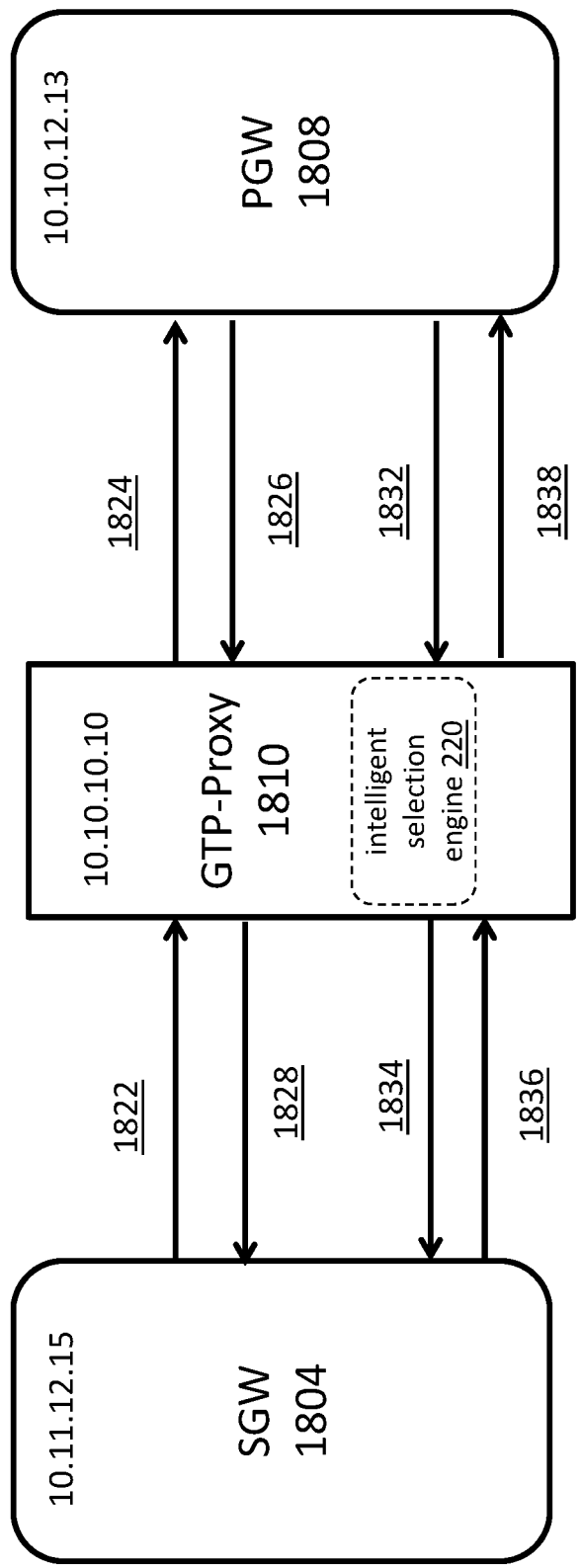
FIG. 18 is a diagram showing path management for echo request/response recoveries, according to some embodiments of the present disclosure.

GTP-proxy 210 with intelligent selection engine 220 can also be used by operators to perform offline software upgrades of PGW nodes without modifying DNS settings on MME side as GTP-Proxy can choose an alternate PGW nodes FIG. 18 is a diagram showing path management for echo request/response recoveries, according to some embodiments of the present disclosure. FIG. 18 shows GTP Proxy 1910 with IP address 10.10.10.10, SGW 1804 with IP address 10.11.12.15, and PGW 1808 with IP address 10.10.12.13. Other than having assigned IP addresses, SGW 1804, GTP-proxy 1810, PGW 1808 have the same function and structure as SGW 734, GTP-Proxy 210, and PGW 738, respectively. FIG. 18 also shows echo request recovery 1822, echo request recovery 1824, echo response recovery 1826, echo response recovery 1828, shows echo request recovery 1832, echo request recovery 1834, echo response recovery 1836, and echo response recovery 1838.

SGW 1804 sends echo request recovery 1822 to GTP-proxy 1810. An echo request is used by one node to ping or recover a connection with a peer node over a GTP interface. Echo request recovery is associated with a value of 10. A GTP entity (e.g., PGW or SGW or GTP Proxy) can maintain two restart counters. One is the counter sent by the peer and the other is its own counter. When the entity restarts, it can immediately increment its restart counter and send the new value in subsequent echo requests or responses. This value refers to the restart counter (or recovery value) associated with the sending node.

GTP-proxy 1810 sends echo request recovery 1824 to PGW 1808. Echo request recovery is associated with a value of 20.

PGW 1808 sends echo response recovery 1826 to GTP proxy 1810. Echo response recovery is associated with a value of 30.

GTP-proxy 1810 sends echo response recovery 1828 to SGW 1804. Echo response recovery is associated with a value of 20.

PGW 1808 sends echo request recovery 1832 to GTP proxy 1910. Echo request recovery is associated with a value of 30.

GTP-proxy 1810 sends echo request recovery 1834 to SGW 1804. Echo request recovery is associated with a value of 20.

SGW 1804 sends echo response recovery 1836 to GTP-proxy 1810. Echo response recovery is associated with a value of 10.

GTP-proxy 1810 sends echo response recovery 1838 to PGW 1808. Echo response recovery is associated with a value of 20.

Having GTP proxy 1810 inserted between an SGW 1804 and PGW 1808 allows for improved echo messaging. When a GTP proxy is inserted between SGWs and PGWs, it handles path management procedures with the SGWs and PGWs. The SGWs send echo request and responses towards the GTP proxy only and is not aware of the presence of PGWs. As a result, the SGWs do not have to handle path management procedures with multiple PGWs in the network. The PGW too does not have to handle echo requests and responses towards/from multiple SGWs and it interfaces only with GTP-Proxy. This greatly reduces the number of messages exchanged. When GTP_Proxy detects that a PGW is down, it can choose a different available PGW during a session setup. This is in contrast to prior art where when an SGW cannot reach the PGW, the call setup fails.

Figure 19:
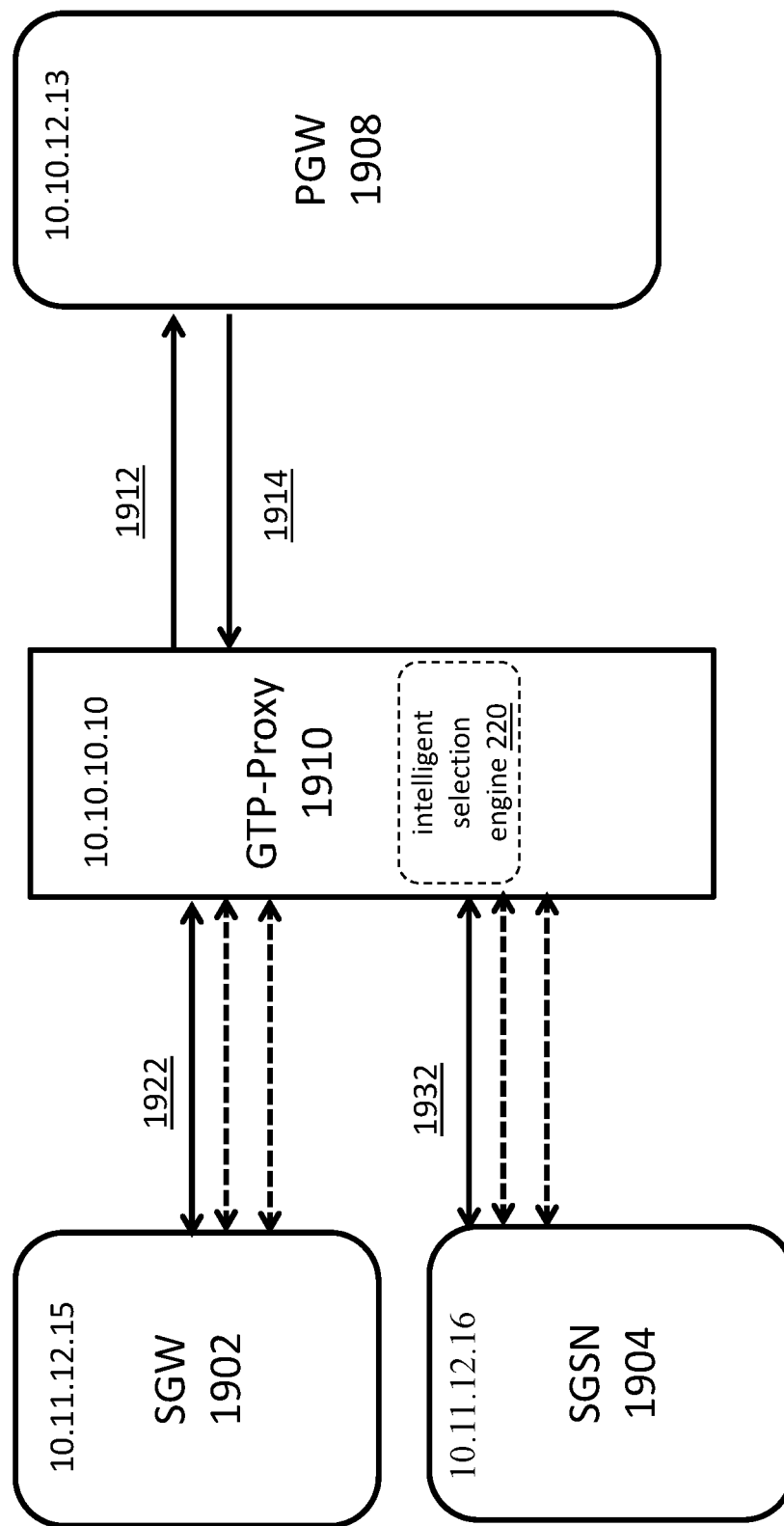
FIG. 19 is a diagram showing path management for PGW failure, according to some embodiments of the present disclosure.

FIG. 19 is a diagram showing path management for PGW failure, according to some embodiments of the present disclosure. FIG. 19 shows GTP Proxy 1910 with IP address 10.10.10.10, SGW 1902 with IP address 10.11.12.15, SGSN 1904 with an IP address of 10.11.12.16, and PGW 1908 with IP address 10.10.12.13. Other than having assigned IP addresses, SGW 1902, SGSN 1904, GTP-proxy 1910, PGW 1908 have the same function and structure as SGW 734, SGSN 732, GTP-Proxy 210, and PGW 738, respectively. FIG. 19 also shows delete bearer requests/responses 1922, echo request recovery 1912, echo response recovery 1914, delete PDP context requests/responses 1932.

GTP proxy 1910 transmits an echo request recovery 1912 to PGW 1908. As described above, an echo request is used by one node to ping or recover a connection with a peer node over a GTP interface. Echo request recovery is associated with a value of 20.

PGW 1908 transmits echo response recovery 1914 to GTP proxy 1910. Echo response recovery is associated with a value of 31. This value indicates that PGW 1908 has failed. As described above, a GTP entity (e.g., PGW or SGW or GTP Proxy) can maintain two restart counters. One is the counter sent by the peer and the other is its own counter. When the entity restarts, it can immediately increment its restart counter and send the new value in subsequent echo requests or responses. If a peer node restarts, it sends a new value to the entity. When the entity detects that the value is different compared to what was sent before, it can detect that the peer has restarted. In this example, receiving 31 indicates failure if the peer had previously sent 30.

GTP-proxy 1910 communicates this failure to SGW 1902 and SGSN 1904 by transmitting delete bearer requests 1912 and receiving delete bearer responses from SGW 1902 and SGSN 1904. GTP-proxy 1910 also communicates this failure to SGW 1902 and SGSN 1904 by transmitting delete pdp context request to SGSN and receiving delete pdpd context response from SGSN.

Having GTP proxy 1910 inserted between SGWs 1902 1904 and PGW 1908 allows for improved handling of a failed PGW. As previously described, when a GTP proxy is inserted between SGWs and PGWs, it handles path management procedures with the SGWs and PGWs. The SGWs send echo request and responses towards the GTP proxy only and is not aware of the presence of PGWs. As a result, the SGWs do not have to handle path management procedures with multiple PGWs in the network. The PGW too does not have to handle echo requests and responses towards/from multiple SGWs and it interfaces only with GTP-Proxy. This greatly reduces the number of messages exchanged. When GTP Proxy detects that a PGW is down, it can choose a different available PGW during a session setup. This is in contrast to prior art, where when an SGW cannot reach the PGW, the call setup fails.

Figure 20:
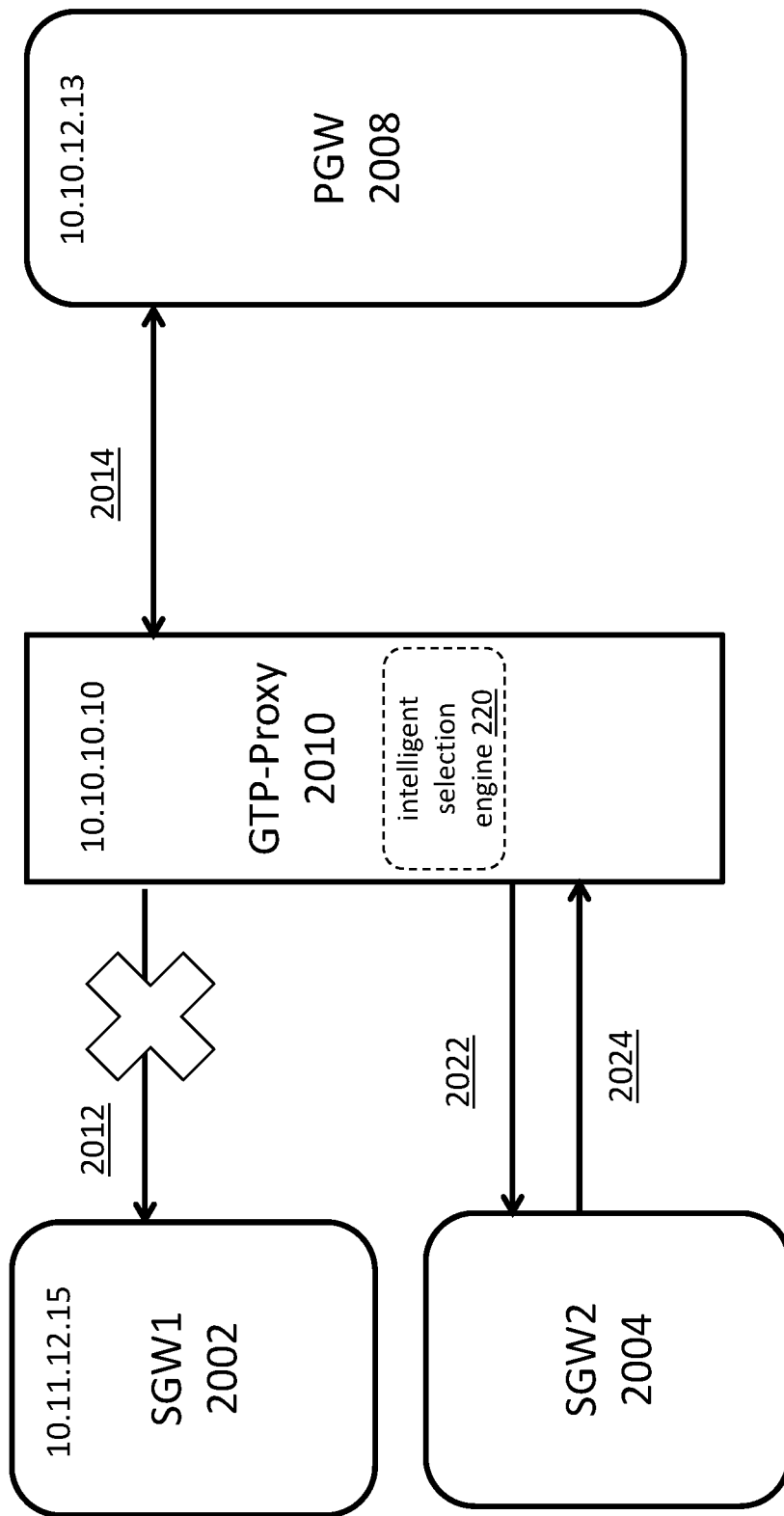
FIG. 20 is a diagram showing path management for SGW failure, according to some embodiments of the present disclosure.

FIG. 20 is a diagram showing path management for SGW failure, according to some embodiments of the present disclosure. FIG. 20 shows GTP Proxy 2010 with IP address 10.10.10.10, SGW1 2002 with IP address 10.11.12.15, SGW2 2004 with an IP address of 10.11.12.16, and PGW 2008 with IP address 10.10.12.13. Other than having assigned IP addresses, SGW1 2002/SGW2 2004, GTP-proxy 2010, and PGW 2008 have the same function and structure as SGW 734, GTP-Proxy 2010, and PGW 738, respectively. FIG. 20 also shows echo request recovery 2012, delete session requests/responses for sessions belonging to SGW1 2014, echo request recovery 2022, and echo response recovery 2024.

GTP proxy 2010 sends echo request recovery 2012 to SGW1 2012. Echo request recovery is associated with a value of 20. Because SGW1 2012 has failed, GTP-proxy 2010 does not receive an echo request response from SGW1 2012.

GTP proxy 2010 then sends a delete session request 2014 to PGW 2008 to delete session belonging to SGW1 2002. PGW 2008 acknowledges that it has deleted the sessions belonging to SGW1 in a delete session response 2014.

GTP proxy 2010 then transmits echo request recovery 2022 to SGW2 2014. Echo request recovery 2022 is associated with a value of 20

SGW 2004 transmits echo response recovery 2024 to GTP proxy 2010. Echo response recovery 2024 is associated with a value of 10.

Having GTP proxy 2010 inserted between SGWs 2002 2004 and PGW 2008 allows for improved handling of a failed SGW. As previously described, when a GTP proxy is inserted between SGWs and PGWs, it handles path management procedures with the SGWs and PGWs. The SGWs send echo request and responses towards the GTP proxy only and is not aware of the presence of PGWs. As a result, the SGWs do not have to handle path management procedures with multiple PGWs in the network. The PGW too does not have to handle echo requests and responses towards/from multiple SGWs and it interfaces only with GTP-Proxy. This greatly reduces the number of messages exchanged. When GTP Proxy detects that a PGW is down, it can choose a different available PGW during a session setup. This is in contrast to prior art where when an SGW cannot reach the PGW, the call setup fails.

Figure 21:
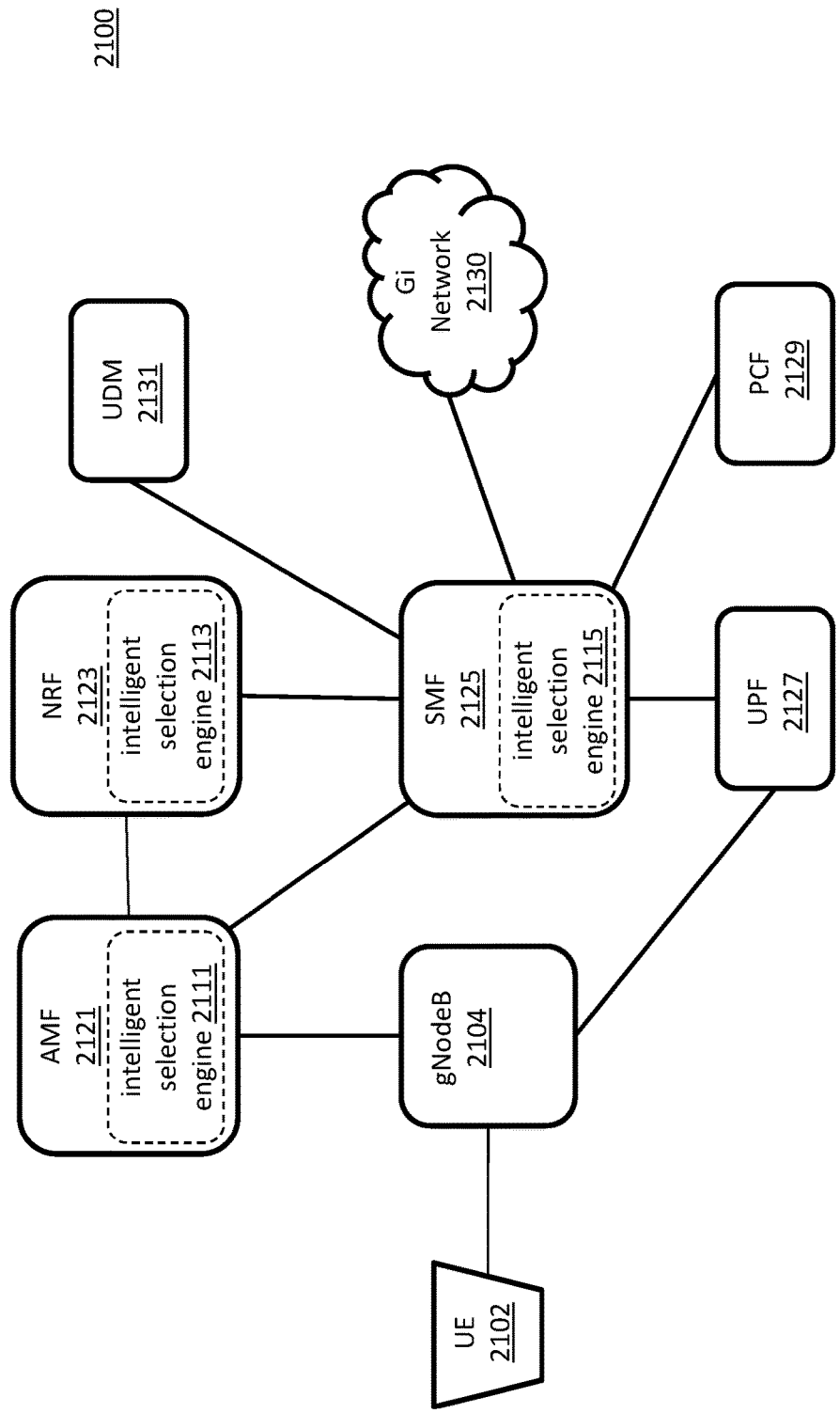
FIG. 21 is a system diagram showing a networked system, according to some embodiments of the present disclosure.

FIG. 21 is a diagram showing an exemplary 5G architecture 2100, according to some embodiments. 5G architecture 2100 includes a UE 2102, Next Generation NodeB ("gNodeB") 2104, Access and Mobility Management Function ("AMF") 2121, Network Function ("NF") Repository Function ("NRF") 2123, Session Management Function ("SMF") 2125, User Plane Function ("UPF") 2127, Unified Data Management ("UDM") 2131, PCF 2129, Gi Network 2130, and one or more of intelligent selection engines 2111, 2113, and/or 2115. gNodeB 2104 can be, for example, a 5G New Radio ("NR") base station. An intelligent selection engine can be inserted in various network elements in the 5G core network. For example, in some embodiments, one or more of intelligent selection engines 2111, 2113, and/or 2115 can be implemented in AMF 2121, NRF 2123, and 2125, respectively. In an embodiment, intelligent selection engine 2113 is inserted into an NRF 2123, and can be used to select various network functions such as the AMF 2121, SMF 2125, UPF 2127, UDM 2131 and/or PCF 2129 based on parameters such as, but not limited to, plmnid, Data Network Name ("dnn"), Single Network Slice Selection Assistance Information ("s-nssai"), and tracking area. Intelligent selection engine 2113 can run as a micro-service or library in NRF 2123. The intelligent selection engine 2113 can run as a container or virtual machine or on a blade within NRF 2123, in some embodiments. Intelligent selection engine 2113 can operate similarly to other intelligent selection engines described above.

In some embodiments, in the absence of NRF 2123, intelligent selection engine 2115 can be used by an SMF 2125 to select the UPF 2127, PCF 2129, and/or UDM 2131 for a session using session parameters such as, but not limited to, dnn, s-nssai and tracking area. Intelligent selection engine 2115 can run as a micro-service or library in SMF 2125. The intelligent selection engine 2115 can run as a container or virtual machine or on a blade within SMF 2125, in some embodiments. Intelligent selection engine 2115 can operate similarly to other intelligent selection engines described above.

In some embodiments, in the absence of the NRF 2123, intelligent selection engine 2111 can be inserted into AMF 2121 and can be used by AMF 2121 to select the SMF 2125 for a session using session parameters such as, but not limited to, dnn, s-nssai, and subscriber tracking area. Intelligent selection engine 2111 can run as a micro-service or library in AMF 2121. The intelligent selection engine 2111 can run as a container or virtual machine or on a blade within AMF 2121, in some embodiments. Intelligent selection engine 2111 can operate similarly to other intelligent selection engines described above.

Each of intelligent selection engines 2111, 2113, 2115 can be deployed independently or in conjunction with another intelligent selection engine. It should be appreciated that still further implementations of an intelligent selection engine are contemplated within 5G networks.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A method, comprising:
   receiving, by a selection engine, a trigger to select a peer node for a subscriber session;
   analyzing, by the selection engine, subscriber session data to determine one or more parameters of the subscriber session data;
   selecting, by the selection engine, one or more network functions for the subscriber session based on the one or more parameters;
   identifying, by the selection engine, a peer selector that matches the one or more parameters;
   determining, by the selection engine, whether the peer selector is associated with a fully qualified domain name (FQDN);
   in response to determining that the peer selector is associated with the FQDN, determining, by the selection engine, whether a domain name system (DNS) server is configured;
   in response to determining that the DNS server is configured, requesting, by the selection engine, a peer list associated with the FQDN from the DNS server; and
   selecting, by the selection engine, the peer node from the peer list.

2. The method of claim 1, wherein the trigger includes an indication of session traffic traversing a 5G New Radio (NR) base station node.

3. The method of claim 1, wherein the one or more parameters include one or more of a Public Land Mobile Network Identification (PLMNID), a Data Network Name (DNN), a Single Network Slice Selection Assistance Information (S-NSSAI), or a tracking area.

4. The method of claim 1, wherein the network functions include one or more of an Access and Mobility Management Function (AMF), a Session Management Function (SMF), User Plane Function (UPF), Unified Data Management (UDM), or Policy Control Function (PCF).

5. The method of claim 1, wherein the DNS server is configured when at least one of a primary DNS server or a secondary DNS server is provisioned and reachable.

6. The method of claim 1, wherein selecting the peer node from the peer list further comprises:
   receiving, by the selection engine, the peer list;
   eliminating, by the selection engine, one or more unreachable peer nodes from the peer list;
   eliminating, by the selection engine, one or more peer nodes that are in overload from the peer list;
   grouping, by the selection engine, one or more remaining peer nodes in the peer list based on a load level associated with each of the one or more remaining peer nodes, yielding a plurality of peer groups that each include one or more peer nodes; and
   selecting, by the selection engine, the peer node from a least loaded peer group among the plurality of peer groups.

7. The method of claim 1, wherein the selection engine is implemented in a Network Repository Function (NRF) network element as a micro-service or library, and
   wherein the one or more parameters include one or more of a Public Land Mobile Network Identification (PLMNID), a Data Network Name (DNN), a Single Network Slice Selection Assistance Information (S-NSSAI), or a tracking area.

8. The method of claim 1, wherein the selection engine is implemented in a Network Repository Function (NRF) network element as a container or a virtual machine.

9. The method of claim 1, wherein the selection engine is implemented in a Session Management Function (SMF) network element as a micro-service or library, and wherein the one or more parameters include one or more of a Data Network Name (DNN), a Single Network Slice Selection Assistance Information (S-NSSAI), or a tracking area.

10. The method of claim 1, wherein the selection engine is implemented in a Session Management Function (SMF) network element as a container or a virtual machine.

11. The method of claim 1, wherein the selection engine is implemented in an Access and Mobility Management Function (AMF) network element as a micro-service or library, and
wherein the one or more parameters include one or more of a Data Network Name (DNN), a Single Network Slice Selection Assistance Information (S-NSSAI), or a tracking area.

12. The method of claim 1, wherein the selection engine is implemented in an Access and Mobility Management Function (AMF) network element as a container or a virtual machine.

13. The method of claim 1, wherein the selection engine is implemented in any combination of a Network Repository Function (NRF) network element, a Session Management Function (SMF) network element, or an Access and Mobility Management Function (AMF) network element.

14. A system, comprising:
a processor; and
a memory coupled to the processor and including computer-readable instructions that, when executed by the processor, cause the processor to:
receive a trigger to select a peer node for a subscriber session;
analyze subscriber session data to determine one or more parameters of the subscriber session data;
select one or more network functions for the subscriber session based on the one or more parameters;
identify a peer selector that matches the one or more parameters;
determine whether the peer selector is associated with a fully qualified domain name (FQDN);
in response to determining that the peer selector is associated with the FQDN, determine whether a domain name system (DNS) server is configured;
in response to determining that the DNS server is configured, request a peer list associated with the FQDN from the DNS server; and
select the peer node from the peer list.

15. The system of claim 14, wherein the trigger includes an indication of session traffic traversing a 5G New Radio (NR) base station node.

16. The system of claim 14, wherein the one or more parameters include one or more of a Public Land Mobile Network Identification (PLMNID), a Data Network Name (DNN), a Single Network Slice Selection Assistance Information (S-NSSAI), or a tracking area.

17. The system of claim 14, wherein the network functions include one or more of an Access and Mobility Management Function (AMF), a Session Management Function (SMF), User Plane Function (UPF), Unified Data Management (UDM), or Policy Control Function (PCF).

18. The system of claim 14, wherein the DNS server is configured when at least one of a primary DNS server or a secondary DNS server is provisioned and reachable.

19. The system of claim 14, wherein the processor selects the peer node from the peer list by:
receiving the peer list;
eliminating one or more unreachable peer nodes from the peer list;
eliminating one or more peer nodes that are in overload from the peer list;
grouping one or more remaining peer nodes in the peer list based on a load level associated with each of the one or more remaining peer nodes, yielding a plurality of peer groups that each include one or more peer nodes; and
selecting the peer node from a least loaded peer group among the plurality of peer groups.

20. The system of claim 14, wherein the processor is implemented in any combination of a Network Repository Function (NRF) network element, a Session Management Function (SMF) network element, or an Access and Mobility Management Function (AMF) network element of the system.

* * * * *